(12) United States Patent
Jiang et al.

(10) Patent No.: US 11,078,933 B2
(45) Date of Patent: Aug. 3, 2021

(54) PASSIVE FOLLOW-UP HYDRAULIC ROTARY JOINT

(71) Applicant: WUHAN UNIVERSITY OF SCIENCE AND TECHNOLOGY, Wuhan (CN)

(72) Inventors: Lin Jiang, Wuhan (CN); Xiaoyue Pan, Wuhan (CN); Wei Xie, Wuhan (CN); Tixian Tian, Wuhan (CN); Lisheng Ren, Wuhan (CN); Zhao Wang, Wuhan (CN); Liang Zhou, Wuhan (CN); Zhipeng Yu, Wuhan (CN); Han Wang, Wuhan (CN); Xumin Gao, Wuhan (CN); Hui Zhao, Wuhan (CN); Jianyang Zhu, Wuhan (CN)

(73) Assignee: WUHAN UNIVERSITY OF SCIENCE AND TECHNOLOGY, Wuhan (CN)

( * ) Notice: Subject to any disclaimer, the term of this patent is extended or adjusted under 35 U.S.C. 154(b) by 759 days.

(21) Appl. No.: 15/955,671

(22) Filed: Apr. 17, 2018

(65) Prior Publication Data
US 2018/0306213 A1 Oct. 25, 2018

(30) Foreign Application Priority Data
Apr. 24, 2017 (CN) .......................... 201710272707.1

(51) Int. Cl.
*F15B 15/12* (2006.01)
*F15B 9/14* (2006.01)
(Continued)

(52) U.S. Cl.
CPC ............. *F15B 15/125* (2013.01); *B25J 9/126* (2013.01); *B25J 9/146* (2013.01); *F15B 9/14* (2013.01);
(Continued)

(58) Field of Classification Search
CPC ........ B25J 9/126; B25J 9/146; B25J 17/0208; B25J 19/063; F15B 15/125; F15B 2211/7058
See application file for complete search history.

(56) References Cited

U.S. PATENT DOCUMENTS 4,848,546 A * 7/1989 McCormick ......... B25J 17/0208
192/56.32
6,333,696 B1 * 12/2001 Matsumiya ............ B25J 19/063
340/679
(Continued)

*Primary Examiner* — Thomas E Lazo
(74) *Attorney, Agent, or Firm* — Matthias Scholl P.C.; Matthias Scholl

(57) ABSTRACT

A rotary joint, including: a hydraulic follow-up mechanism and a rotary transmission mechanism. The hydraulic follow-up mechanism includes a cylinder body, a valve sleeve, a valve core, a valve body, a left end cover and a right end cover. The rotary transmission mechanism includes a tray, a stabilizing ring, a follow-up disk, a torque transfer disk and a stable supporting wheel mechanism. The left end cover and the right end cover are arranged at the left and right ends of the cylinder body, respectively. The valve body is concentrically mounted in a cylindrical hollow chamber of the cylinder body. The output shaft at the right end of the valve body projects out of the right end cover. The right end of the valve core is provided with a valve core torque transfer shaft extending rightwards through the right end of the valve body.

10 Claims, 28 Drawing Sheets

(51) Int. Cl.
*F15B 15/06* (2006.01)
*B25J 9/14* (2006.01)
*B25J 9/12* (2006.01)
B25J 17/02 (2006.01)
B25J 19/06 (2006.01)

(52) U.S. Cl.
CPC ............ *F15B 15/068* (2013.01); *F15B 15/12* (2013.01); *B25J 17/0208* (2013.01); *B25J 19/063* (2013.01); *F15B 2211/7058* (2013.01); *F15B 2215/30* (2013.01)

(56) References Cited

U.S. PATENT DOCUMENTS

| | | | | |
|---|---|---|---|---|
| 6,690,208 B2 * | 2/2004 | Gloden | ................ | B25J 19/063 192/150 |
| 9,782,894 B2 * | 10/2017 | Ryu | ....................... | F15B 15/14 |

* cited by examiner

PASSIVE FOLLOW-UP HYDRAULIC ROTARY JOINT

CROSS-REFERENCE TO RELATED APPLICATIONS

Pursuant to 35 U.S.C.§ 119 and the Paris Convention Treaty, this application claims foreign priority to Chinese Patent Application No. 201710272707.1 filed Apr. 24, 2017, the contents of which and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The disclosure relates to the technical field of robotic joints, and more particularly to a passive follow-up hydraulic rotary joint.

Description of the Related Art

Hydraulic rotating angle servo technology combines hydraulic technology with motor technology to directly drive a valve core by using a small torque of a motor to open a valve port so that high pressure oil acts on a valve body to obtain a large output torque. As a core component in a hydraulic control system, a hydraulic rotating angle self-servo valve has been widely used in high-precision electro-mechanical integration systems, onboard drive systems of aerospace and large testing equipment because of its advantages such as high precision and fast reaction.

The security of human-machine physical contact is an indispensable characteristic of an interactive robot. At present, prohibitive inhibition for human-machine physical contact force is mainly carried out by a force sensor actively releasing from contact, while active control cannot immediately perform inhibition for collision contact force. In addition, an existing passive compliant arm possesses no passive follow-up characteristic so that the inhibition effect of the collision contact force is poor. This further reduces the safety and motion performance of robots.

SUMMARY OF THE INVENTION

In view of the above-described problems, it is one objective of the invention to provide a passive follow-up hydraulic rotary joint for a robot.

To achieve the above objective, in accordance with one embodiment of the present disclosure, there is provided a passive follow-up hydraulic rotary joint, comprising: a hydraulic follow-up mechanism and a rotary transmission mechanism connected to a front joint. The hydraulic follow-up mechanism comprises a cylinder body, a valve sleeve, a valve core, a valve body, a left end cover and a right end cover. The left end cover and the right end cover are arranged at the left and right ends of the cylinder body, respectively. The valve body is concentrically mounted in a cylindrical hollow chamber of the cylinder body, and an output shaft at the right end of the valve body projects out of the right end cover. The right end of the valve core is provided with a valve core torque transfer shaft extending rightwards through the right end of the valve body.

The rotary transmission mechanism comprises a tray, a stabilizing ring, a follow-up disk, a torque transfer disk and a stable supporting wheel mechanism. The tray and the stabilizing ring constitute a tray mechanism. The tray mechanism is concentrically mounted on a spigot on an outer side of the output shaft at the right end of the valve body. The follow-up disk is concentrically mounted on the output shaft at the right end of the valve body. A thrust ball bearing is concentrically mounted between the follow-up disk and the tray mechanism; two deep groove ball bearings are concentrically mounted at the right end of the follow-up disk, and a fixing nut is mounted at the right end of the valve body. The torque transfer disk is concentrically mounted at the right end of the valve core; four stable supporting wheel mechanisms are mounted centrally symmetrically on the torque transfer disk, and stabilizing wheels of the four stabile supporting wheel mechanisms are respectively mounted in four stabilizing grooves opened on the stabilizing ring.

The tray is connected to the stabilizing ring through a screw. The tray mechanism, the thrust ball bearing, the follow-up disk and the deep groove ball bearing are axially fixed with a shaft shoulder on an output shaft of the valve body and the fixing nut at the right end of the valve body. The tray mechanism is circumferentially fixed by fitting a convex spigot of the tray with a concave spigot of the valve body on an output shaft of the valve body. A concave spigot of the torque transfer disk is in transitional fitting with a convex spigot of the valve core, and the stable supporting wheel mechanism is fixed on the torque transfer disk via a bolt.

The valve body is concentrically mounted in the cylindrical hollow chamber of the cylinder body, and two deep groove ball bearings are mounted concentrically at the left and right ends of the valve body. The deep groove ball bearing at the left end is concentrically fixed in a left bearing groove of the cylinder body, and the deep groove ball bearing at the right end is concentrically fixed in a right bearing groove of the cylinder body.

A fixing stopper block in movable fitting with the valve body is arranged exactly at the upper part of the inner wall of the cylinder body; and a blade in movable fitting with the cylinder body is arranged on the outer wall of a cylindrical hollow chamber of the valve body.

The valve sleeve is concentrically mounted in the cylindrical hollow chamber of the valve body. The left end surface of the valve sleeve is fixed with the left end surface of the valve body through a cylindrical pin. The right end of the valve core runs through the valve sleeve and is concentrically mounted in the cylindrical hollow chamber of the valve body, and the left and right ends of the valve core are respectively provided with two thrust ball bearings.

A first low-pressure oil passage of the left end cover and a second low-pressure oil passage of the left end cover are correspondingly arranged on the upper and lower parts of the left end cover; an outlet of the first oil passage of the left end cover is a low-pressure oil outlet T; an inlet of the second oil passage of the left end cover is a high-pressure oil inlet P; two lines formed by connecting the center of circle of the first oil passage of the left end cover and the center of circle of the second oil passage of the left end cover with the center of circle of the left end cover respectively form an angle of 150 degrees.

A first oil passage of the cylinder body is radially arranged on the upper part of the cylinder body; a second oil passage of the cylinder body is also axially arranged on the upper part of the cylinder body. The first oil passage of the cylinder body is in communication with the second oil passage of the cylinder body. The second oil passage of the cylinder body is in communication with the first oil passage of the left end cover, and a third oil passage of the cylinder body in communication with the second oil passage of the left end cover is axially arranged on the lower part of the cylinder body.

An inlet of the first oil passage of the cylinder body is in communication with an annular oil groove of the cylinder body. The annular oil groove of the cylinder body is in communication with a first upper oil passage of the valve body and a first lower oil passage of the valve body. The upper and lower parts of a first radial oil passage are in communication with a left T port of the valve sleeve respectively. The left T port of the valve sleeve is in communication with a rectangular groove on a first annular boss of the valve core. The rectangular groove on the first annular boss of the valve core is in communication with a left A port of the valve sleeve. The left A port of the valve sleeve communicates with a corresponding first working chamber through a first rectangular valve port of the valve body.

An inlet of the second oil passage of the cylinder body is in communication with the first annular oil groove of the valve body. The first annular oil groove of the valve body is in communication with a second annular oil groove of the valve body. The second annular oil groove of the valve body is in communication with a right T port of the valve sleeve. The right T port of the valve sleeve is in communication with a rectangular groove on a fourth annular boss of the valve core. The rectangular groove on the fourth annular boss of the valve core is in communication with a right B port of the valve sleeve, and the right B port of the valve sleeve communicates with a corresponding second working chamber through a second rectangular valve port of the valve body.

An outlet of the third oil passage of the cylinder body is in communication with the annular oil groove of the valve body. The annular oil groove of the valve body is in communication with a folding-line-shaped oil passage of the valve body. The folding-line-shaped oil passage of the valve body is in communication with a left P port of the valve sleeve and a right P port of the valve sleeve respectively. The left P port of the valve sleeve is in communication with a rectangular groove on a second annular boss of the valve core. The rectangular groove on the second annular boss of the valve core is in communication with a right A port of the valve sleeve, and the right A port of the valve sleeve is in communication with a corresponding first working chamber through a first rectangular valve port of the valve body; and the right P port of the valve sleeve is in communication with a rectangular groove on a third annular boss of the valve core. The rectangular groove on the third annular boss of the valve core is in communication with a left B port of the valve sleeve, and the left B port of the valve sleeve is in communication with the corresponding second working chamber through the second rectangular valve port of the valve body.

The valve body comprises a hollow cylinder, a blade, a cylindrical boss and a valve body output shaft from left to right; the outer diameter of the cylinder is equal to the inner diameter of a circular hole of the cylinder body in nominal size. The cylindrical hollow chamber of the valve body and a bearing groove of the valve body are opened inside the cylinder. The inner diameter of the cylindrical hollow chamber of the valve body is equal to the outer diameter of the valve sleeve in nominal size, two semicircular cylindrical pin holes having the same size are opened on the left end of the cylindrical hollow chamber of the valve body. The two pin holes are distributed to form an angle of 180 degrees, two valve body sealing grooves are opened on a cylindrical surface at the left end of the cylinder. The annular oil groove of the cylinder body is located between two sealing grooves at the left end of the valve body, and the first upper oil passage of the valve body and the first lower oil passage of the valve body are arranged between the sealing grooves.

The blade, the length of which is equal to a difference between the length of the cylindrical hollow chamber of the cylinder body and the length of the cylindrical boss of the valve body, is arranged on the lower part of the outer wall of the cylinder body; the difference between radians of upper and lower cambered surfaces of the blade is half of a difference between the inner diameter of the cylindrical hollow chamber of the cylinder body and the outer diameter of the cylinder of the valve body; a strip-shaped sealing groove is axially arranged in the center of the lower cambered surface of the blade, and the strip-shaped sealing groove having the same length as the blade is embedded with a blade sealing strip.

The outer diameter of the cylindrical boss is equal to the inner diameter of the cylindrical hollow chamber of the cylinder body in nominal size, a cylindrical surface of the cylindrical boss is provided with three valve body sealing grooves. The first annular oil groove of the valve body and the second annular oil groove of the valve body are arranged between the left and middle valve body sealing grooves; and the annular oil groove of the valve body and the folding-line-shaped oil passage of the valve body are arranged between the middle and right valve body sealing grooves.

The second rectangular valve port is arranged on a hollow cylinder close to the cylindrical boss. The first rectangular valve port is arranged on a hollow cylinder close to the left valve body sealing groove, and the first rectangular valve port 38 has the same size as the second rectangular valve port.

A plain line at the opening of the folding-line-shaped oil passage of the valve body is located in exact middle between a plain line of the center of the second rectangular valve port and a plain line of the center of the first rectangular valve port, and an angle formed by the plain line of the center of the second rectangular valve port and the plain line of the center of the first rectangular valve port is θ which is calculated according to the following formula:

$$\theta = \frac{b_1 + b_2}{r} \quad (1)$$

where b1 represents the arc length of the inner wall of the blade, b2 represents the arc length of a rectangular valve port on a hollow cylinder, and r represents the outer diameter of the hollow cylinder; a through hole is concentrically arranged inside the valve body. The diameter of the through hole is slightly greater than the diameter of the valve core torque transfer shaft. The left end of the through hole is in communication with the valve body bearing groove; and two concave spigots of the valve body are centrically symmetrically arranged on the outer wall of the right end of the output shaft.

The valve core is provided from left to right with a cylinder, a first annular boss, a second annular boss, a third annular boss, a fourth annular boss, a fifth annular boss and a valve core torque transfer shaft. The right side of each of the first annular boss, the second annular boss, the third annular boss and the fourth annular boss is provided with two rectangular grooves of the same size which are distributed to form an angle of 180 degrees, each two rectangular grooves are on the same circumferential line; the center line of the two rectangular grooves of the first annular boss and the center line of the two rectangular grooves of the third annular boss are respectively located on two plain lines with two axis centers being symmetrical, the center line of the two rectangular grooves of the second annular boss and the center line of the two rectangular grooves of the fourth annular boss are respectively located on another two plain lines with two axis centers being symmetrical, and every two adjacent plain lines differ from each other by 90 degrees.

A cylinder is concentrically arranged on the left end of the valve core. The diameter of the cylinder is equal to the inner diameter of the left thrust ball bearing but slightly smaller than the diameter of a central hole of the left end cover; the right end of the valve core is provided with the valve core torque transfer shaft. The diameter of the valve core torque transfer shaft is slightly smaller than the diameter of a through hole at the right end of the valve body but equal to the inner diameter of the right thrust ball bearing, and a convex spigot is arranged at the right end of the valve core torque transfer shaft.

The valve sleeve comprises six annular bosses and five grooves. The annular bosses and the grooves are alternatively arranged; the annular boss at the left end of the valve sleeve is provided with two semicircular cylindrical pin holes arranged to form an angle of 180 degrees; two rectangular openings arranged to form an angle of 180 degrees are arranged on each of a first groove and a fifth groove; the two rectangular openings on the first groove constitute the left T port of the valve sleeve, and the two rectangular openings on the fifth groove constitute the right T port of the valve sleeve; the left and right sides of each of the three grooves in the middle of the valve sleeve are respectively provided with a group of rectangular openings and each group of the rectangular openings comprises two rectangular openings arranged to form an angle of 180 degrees; the rectangular openings on the five grooves have the same size. The center lines of the rectangular openings on each of the five grooves are located on the same respective corresponding plain lines, and the rectangular openings on the five grooves have the same size as the rectangular grooves on the four bosses on the valve core.

The left side face of each group of rectangular openings arranged on the left side of each of the three middle grooves of the valve sleeve are on the same plane as the right-side face of an adjacent annular boss. The right-side face of each group of rectangular openings on the right side of each of the three middle grooves are on the same plane as the left side face of an adjacent annular boss. The six groups of rectangular openings in the middle of the valve sleeve are the left A port of the valve sleeve, the right A port of the valve sleeve, the left P port of the valve sleeve, the right P port of the valve sleeve, the left B port of the valve sleeve and the right B port of the valve sleeve in sequence from left to right.

The fixing stopper block is divided into an upper arc-shaped stopper sheet and a lower arc frustum stopper block. The axial length of the upper part of the fixing stopper block is equal to a difference between the length of the cylindrical hollow chamber of the cylinder body and the length of the cylindrical boss of the valve body, a difference between radians of an upper and lower cambered surfaces of the lower arc frustum of the fixing stopper block is half of a difference between the outer diameter of the cylinder body and outer diameter of the cylinder of the valve body; a strip-shaped sealing groove is axially arranged in the center of the lower cambered surface of the fixing stopper block, and the strip-shaped sealing groove having the same length as the fixing stopper block is embedded with a stopper block sealing strip; annular sealing strip grooves are radially symmetrically opened on two sides of a circular hole in the center of the cover body of the right end cover, and the annular sealing strip groove is embedded with an annular sealing strip.

The tray mechanism is formed by connecting the disk-shaped tray and the stabilizing ring through a bolt, a through hole is opened in the center of the tray, two convex spigots of the tray are symmetrically arranged on the through hole. The convex spigot of the tray corresponds in position to the concave spigot on the output shaft of the valve body; the right end of the stabilizing ring is provided with four wheel grooves symmetrically arranged at a same spacing in a circumferential direction and four stopper blocks symmetrically arranged at a same spacing in a circumferential direction, and each of the stopper blocks and an adjacent wheel groove are arranged to form an angle of 45 degrees. The follow-up disk is a stepped cylinder. The inside of the follow-up disk is divided into three cylindrical chambers comprising a left chamber, a middle first cylindrical hollow chamber and a right second cylindrical hollow chamber. The diameter of the first cylindrical hollow chamber is equal to the circumferential diameter of the outer wall of the deep groove ball bearing. The length of the first cylindrical hollow chamber is equal to the sum of the lengths of the two deep groove ball bearings. The diameter of the second cylindrical hollow chamber is greater than the diameter of the first cylindrical hollow chamber, and the length of the second cylindrical hollow chamber is equal to a distance from the right end of the first cylindrical hollow chamber to the left end of the torque transfer disk.

The torque transfer disk is in the shape of a disk having a concave spigot in the center of the disk, four pairs of bolt holes and four concave spigots are centrally symmetrically arranged in a circumferential direction on the torque transfer disk and each pair of bolt holes are symmetrically distributed on both sides of one concave spigot; the stable supporting wheel mechanism comprises a supporting wheel, a supporting plate and a spring. The supporting wheel comprises a left sliding wheel, a middle sliding rod and a right convex spigot. The diameter of the left sliding wheel on the supporting wheel is equal to the diameter of the wheel groove on the stabilizing ring. The middle sliding rod of the supporting wheel is sleeved with the spring. The supporting plate is sleeved on the middle sliding rod of the supporting wheel by means of a hole opened in the middle of the supporting plate; bolt holes are symmetrically opened on both ends of the supporting plate. The convex spigot on the right end of the supporting wheel has the same size as the concave spigot on the torque transfer disk. The spigots are in clearance fitting with each other, and the bolt holes on the supporting plate is matched with bolt holes on both sides of a corresponding concave spigot on the torque transfer disk.

With adoption of the foregoing technical solutions, when a force transferred from an end of the torque transfer disk onto the joint is beyond a safety index, the stable supporting wheel mechanism connected to the valve core is separated from the stabilizing ring on the tray mechanism connected to the output shaft at the right end of the valve body, and the torque transfer disk drives the valve core to rotate. Due to the principle of self-servo, a driving force of the valve core is transferred to the valve body to cause the output shaft of the valve body to passively follow up movement so that the mechanism moves in a direction of reducing an impact force.

The main high-pressure oil inlet P of the device communicates with the third oil passage of the cylinder body through the second oil passage of the left end cover and then with the annular oil groove of the valve body and then with the folding-line-shaped oil passage of the valve body and finally with the left P port and right P port of the valve sleeve. When the valve core rotates anticlockwise relative to the valve sleeve, high-pressure oil enters the rectangular groove on the second annular boss of the valve core through the left P port of the valve sleeve, then enters the right A port of the valve sleeve, and finally enters the first working chamber through the first rectangular valve port of the valve body to push the blade to rotate anticlockwise to cause the valve body to move along with the valve core. The low-pressure oil of the second working chamber enters the right B port of the valve sleeve through the second rectangular valve port of the valve body, then enters the rectangular groove on the fourth annular boss of the valve core, and finally enters the right T port of the valve sleeve. When the valve core rotates clockwise relative to the valve sleeve, high-pressure oil enters the rectangular groove on the third annular boss of the valve core through the right P port of the valve sleeve, then enters the left B port of the valve sleeve, and finally enters the second working chamber through the second rectangular valve port of the valve body to push the blade to rotate clockwise to cause the valve body to move along with the valve core; and the low-pressure oil of the first working chamber enters the left A port of the valve sleeve through the first rectangular valve port of the valve body, then enters the rectangular groove on the first annular boss of the valve core, and finally enters the left T port of the valve sleeve.

The low-pressure oil of the left T port of the valve sleeve enters the annular oil groove of the cylinder body through the first upper oil passage of the valve body and the first lower oil passage of the valve body, then enters the first oil passage of the cylinder body, and enters the low-pressure oil outlet T through the first oil passage of the left end cover to flow back gradually; and the low-pressure oil of the right T port of the valve sleeve enters the first annular oil groove of the valve body through the second annular oil groove of the valve body, then enters the first oil passage of the left end cover through the second oil passage of the cylinder body, and finally flows back gradually through the low-pressure oil outlet T. When the left A port of the valve sleeve communicates with the first working chamber, the left B port of the valve sleeve communicates with the second working chamber, and the right A port of the valve sleeve and the right B port of the valve sleeve are not in communication with each of the first working chamber and the second working chamber; and when the right A port of the valve sleeve communicates with the first working chamber, the right B port of the valve sleeve communicates with the second working chamber, and the left A port of the valve sleeve and the left B port of the valve sleeve are not in communication with each of the first working chamber and the second working chamber. The valve port of the valve sleeve is not in communication with each of the first working chamber and the second working chamber except for the case as above.

The mechanism will restore to a stable supporting state again after an impact force disappears.

In a traditional industrial application, robots are generally used for operations such as assembly, paint spraying and arc welding. Thus, few researches have been made on physical contact and the people mostly focus on a position control of a robot. However, with the expansion of an application range of robots, more and more physical contacts with the environment are involved, and relevant problems become more and more serious. Prohibitive inhibition for a contact force in an existing human-machine physical interaction is mainly carried out with force sensor detection and active release from contact as a main approach. However, some collision contacts have caused an unfavorable consequence before an active control responds, thus, it is needed to inhibit a collision contact force at the first time after a collision occurs; in addition, existing researches fail to combine the compliance characteristic of joint with the passive follow-up characteristic of joint for inhibiting a collision contact force. Further, a robot joint has a poor effect in inhibiting a collision contact force.

Compared with the prior art, the passive follow-up hydraulic rotary joint for a robot disclosed herein has a follow-up characteristic and a plurality of levels of compliance and can switch to a low-rigidity mode quickly when encountering an accidental collision so as to keep the whole mechanism out of danger and then switch back to a high-rigidity mode after the danger is eliminated. Thus, the mechanism has the passive compliance safety of human-machine physical contacts.

In the accompanying drawings, 1 denotes a left end cover, 2 denotes a cylinder body, 3 denotes a valve sleeve, 4 denotes a stabilizing ring, 5 denotes a follow-up disk, 6 denotes a deep groove ball bearing, 7 denotes a torque transfer disk, 8 denotes a fixing nut, 9 denotes a stable supporting wheel mechanism, 10 denotes a thrust ball bearing, 11 denotes a tray, 12 denotes a right end cover, 13 denotes a valve body, 14 denotes a thrust ball bearing, 15 denotes a deep groove ball bearing, 16 denotes a valve core, 17 denotes a first upper oil passage of valve body, 18 denotes a fixing stopper block, 19 denotes a second low-pressure oil passage of valve body, 20 denotes a folding-line-shaped oil passage of valve body, 21 denotes a high-pressure oil passage of cylinder body, 22 denotes a blade, 23 denotes a first lower low-pressure oil passage of valve body, 24 denotes a high-pressure oil passage of left end cover; 25 denotes a left bearing groove of cylinder body, 26 denotes a first low-pressure oil passage of cylinder body, 27 denotes a second low-pressure oil passage of cylinder body, 28 denotes a cylindrical hollow chamber of cylinder body, 29 denotes a right bearing groove of cylinder body, 30 denotes a high-pressure oil passage of cylinder body, 31 denotes a circular hole of cylinder body, 32 denotes an annular low-pressure oil groove of cylinder body, 33 denotes a concave spigot of valve body, 34 denotes a cylindrical hollow chamber of valve body, 35 denotes a bearing groove of valve body, 36 denotes an annular high-pressure oil groove of valve body, 37 denotes an annular low-pressure oil groove of valve body, 38 denotes a first rectangular valve port, 39 denotes a second rectangular valve port, 40 denotes a left T port of valve sleeve, 41 denotes a left A port of valve sleeve, 42 denotes a right A port of valve sleeve, 43 denotes a left P port of valve sleeve, 44 denotes a right P port of valve sleeve, 45 denotes a left B port of valve sleeve, 46 denotes a right B port of valve sleeve, 47 denotes a right T port of valve sleeve, 48 denotes a first annular boss, 49 denotes a second annular boss, 50 denotes a third annular boss, 51 denotes a fourth annular boss, 52 denotes a fifth annular boss, 53 denotes a convex spigot of valve core, 54 denotes a first working chamber, 55 denotes a second working chamber, 56 denotes a convex spigot of tray, 57 denotes an annular sealing strip groove, 58 denotes a first cylindrical hollow chamber, 59 denotes a second cylindrical hollow chamber, 60 denotes a supporting plate, 61 denotes a supporting wheel, 62 denotes a spring, 63 denotes a low-pressure oil passage of left end cover, 64 denotes a wheel groove, 65 denotes a stopper block, and 66 denotes a valve core torque transfer shaft.

DETAILED DESCRIPTION OF THE EMBODIMENTS

Figure 1:
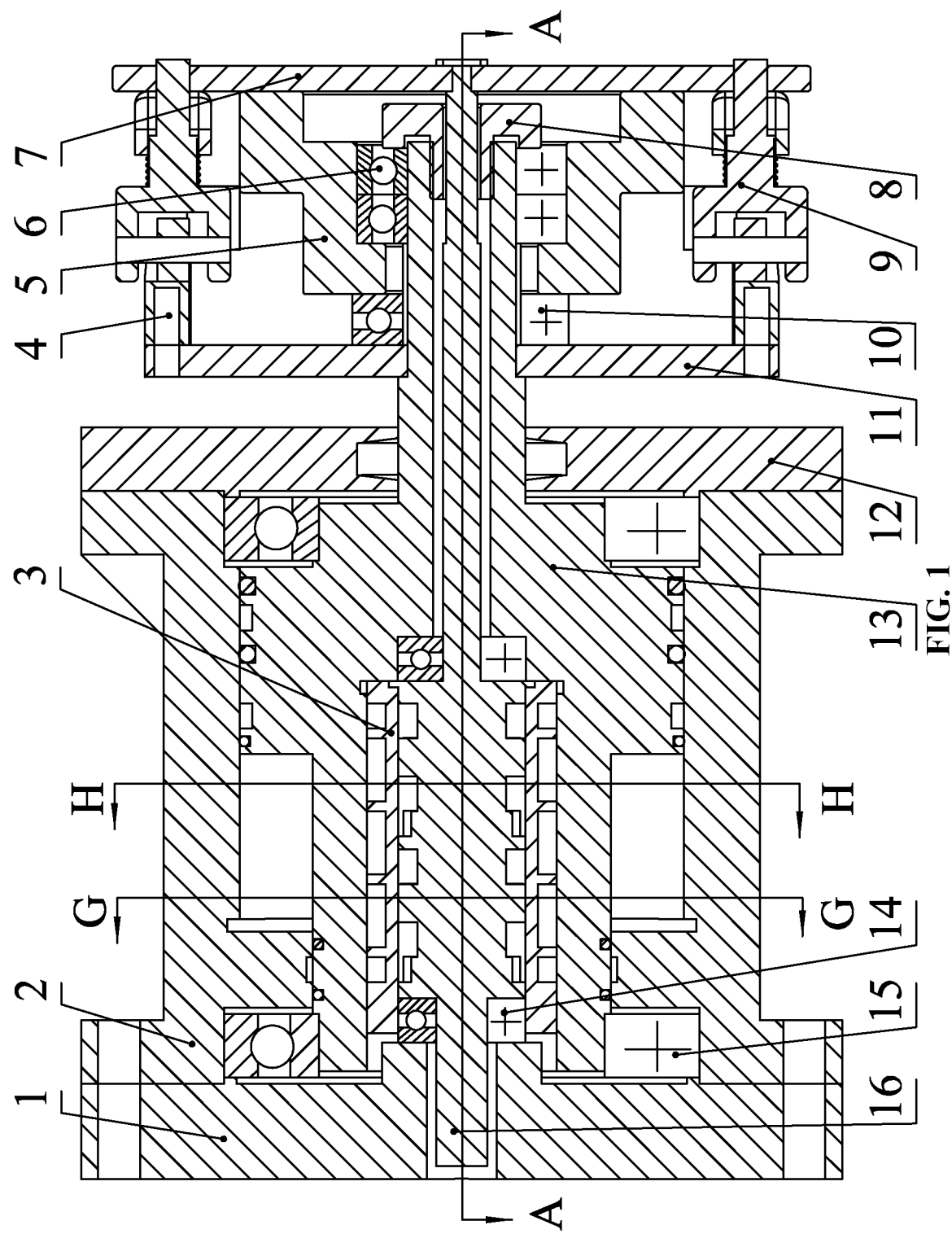
FIG. 1 is a schematic diagram illustrating a structure of a passive follow-up hydraulic rotary joint for a robot according to an example of the disclosure.
Figure 2:
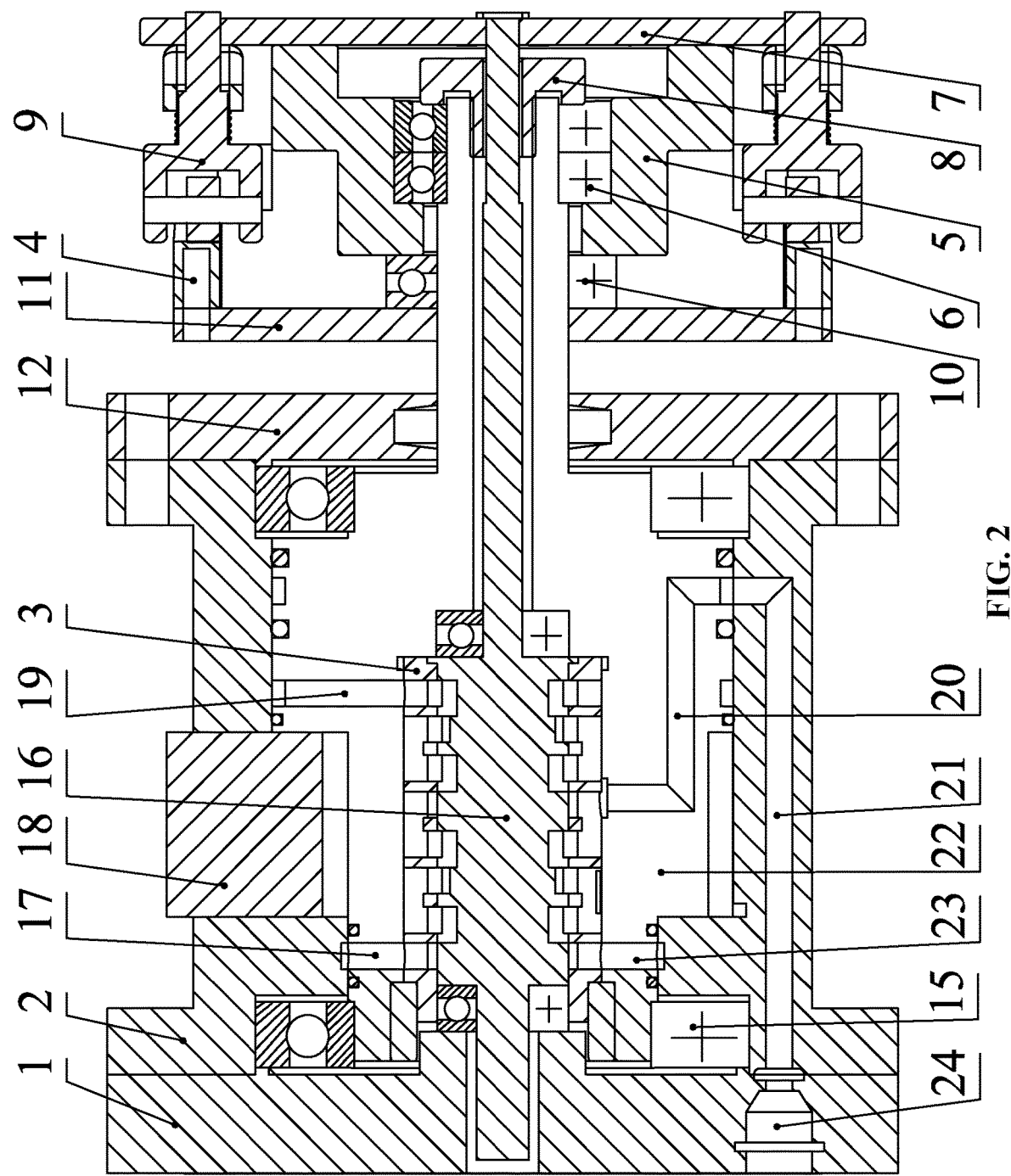
FIG. 2 is a schematic diagram illustrating a section taken along a line A-A shown in FIG. 1.
Figure 3:
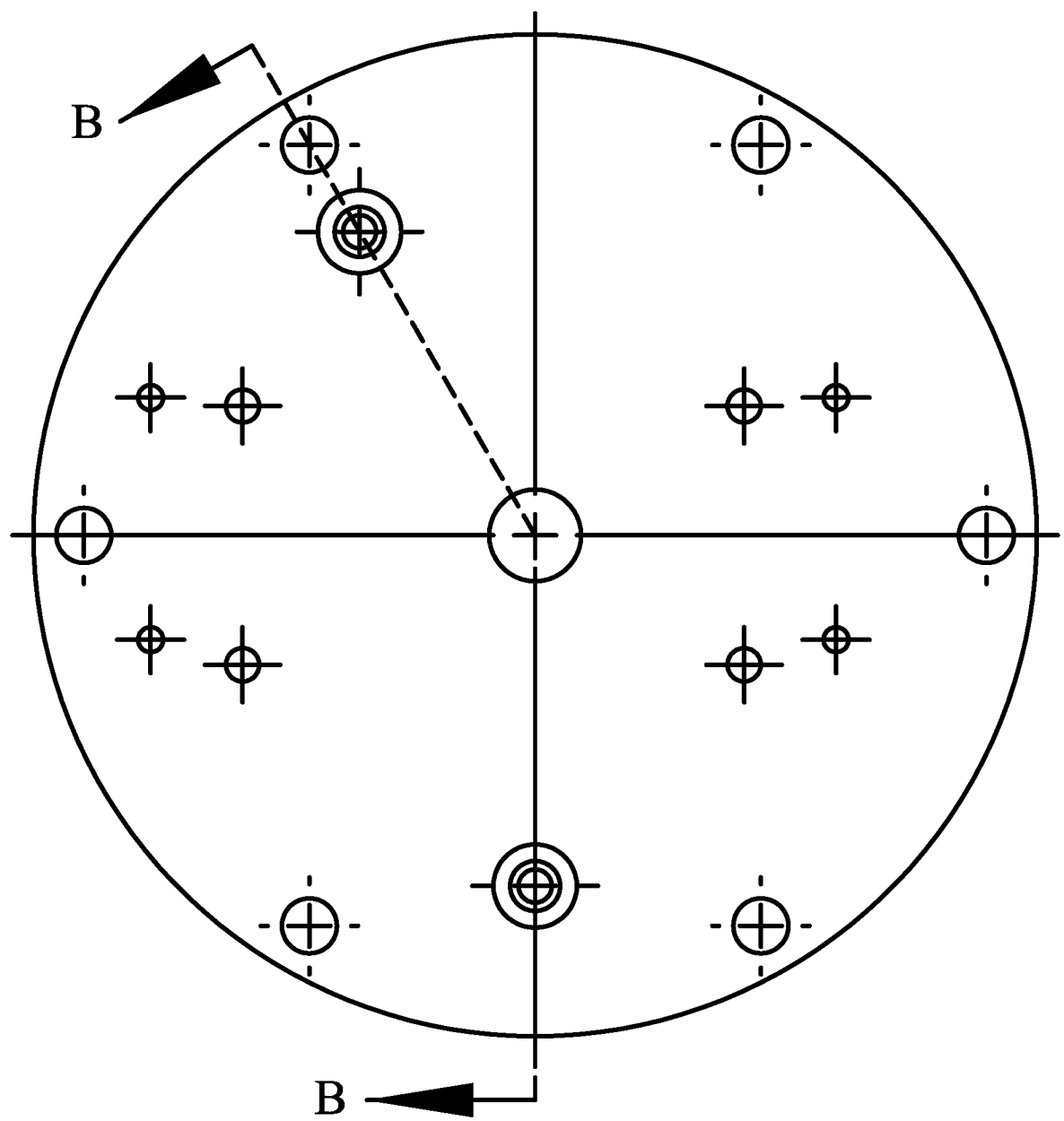
FIG. 3 is a left view of a left end cover.

Technical solutions of the disclosure are described below in detail based on examples in conjunction with the accompanying drawings as shown in FIGS. 1-2, a passive follow-up hydraulic rotary joint for a robot, comprising: a hydraulic follow-up mechanism and a rotary transmission mechanism connected to a front joint. The hydraulic follow-up mechanism comprises a cylinder body 2, a valve sleeve 3, a valve core 16, a valve body 13, a left end cover 1 and a right end cover 12. The left end cover 1 and the right end cover 12 are arranged at the left and right ends of the cylinder body 2 respectively. The valve body 13 is concentrically mounted in a cylindrical hollow chamber 28 of the cylinder body, and an output shaft at the right end of the valve body 13 projects out of the right end cover 12. The right end of the valve core 16 is provided with a valve core torque transfer shaft 66 extending rightwards through the right end of the valve body 13.

The rotary transmission mechanism comprises a tray 11, a stabilizing ring 4, a follow-up disk 5, a torque transfer disk 7 and a stable supporting wheel mechanism 9. The tray 11 and the stabilizing ring 4 constitute a tray mechanism. The tray mechanism is concentrically mounted on a spigot on an outer side of the output shaft at the right end of the valve body 13, the follow-up disk 5 is concentrically mounted on the output shaft at the right end of the valve body 13, a thrust ball bearing 10 is concentrically mounted between the follow-up disk 5 and the tray mechanism, two deep groove ball bearings 6 are concentrically mounted at the right end of the follow-up disk 5, a fixing nut 8 is mounted at the right end of the valve body 13, the torque transfer disk 7 is concentrically mounted at the right end of the valve core 16, four stable supporting wheel mechanisms 9 are mounted centrally symmetrically on the torque transfer disk 7. Stabilizing wheels of the four stabile supporting wheel mechanisms 9 are respectively mounted in four stabilizing grooves opened on the stabilizing ring 4.

The tray 11 is connected to the stabilizing ring 4 through a screw, the tray mechanism, the thrust ball bearing 10, the follow-up disk 5 and the deep groove ball bearing 6 are axially fixed with a shaft shoulder on an output shaft of the valve body 13 and the fixing nut 8 at the right end of the valve body 13, the tray mechanism is circumferentially fixed by fitting a convex spigot 56 of the tray with a concave spigot 33 of the valve body on an output shaft of the valve body 13, a concave spigot of the torque transfer disk 7 is in transitional fitting with a convex spigot 53 of the valve core 16, and the stable supporting wheel mechanism 9 is fixed on the torque transfer disk via a bolt.

As shown in FIG. 2, the valve body 13 is concentrically mounted in the cylindrical hollow chamber 28 of the cylinder body, two deep groove ball bearings 15 are mounted concentrically at the left and right ends of the valve body 13, the deep groove ball bearing at the left end is concentrically fixed in a left bearing groove 25 of the cylinder body, and the deep groove ball bearing at the right end is concentrically fixed in a right bearing groove 25 of the cylinder body.

A fixing stopper block 18 in movable fitting with the valve body 13 is arranged exactly at the upper part of the inner wall of the cylinder body 2; and a blade 22 in movable fitting with the cylinder body 2 is arranged on the outer wall of a cylindrical hollow chamber 34 of the valve body.

The valve sleeve 3 is concentrically mounted in the cylindrical hollow chamber 34 of the valve body, the left end surface of the valve sleeve 3 is fixed with the left end surface of the valve body 13 through a cylindrical pin, the right end of the valve core 16 runs through the valve sleeve 3 and is concentrically mounted in the cylindrical hollow chamber 34 of the valve body, and the left and right ends of the valve core 16 are respectively provided with two thrust ball bearings 14.

Figure 4:
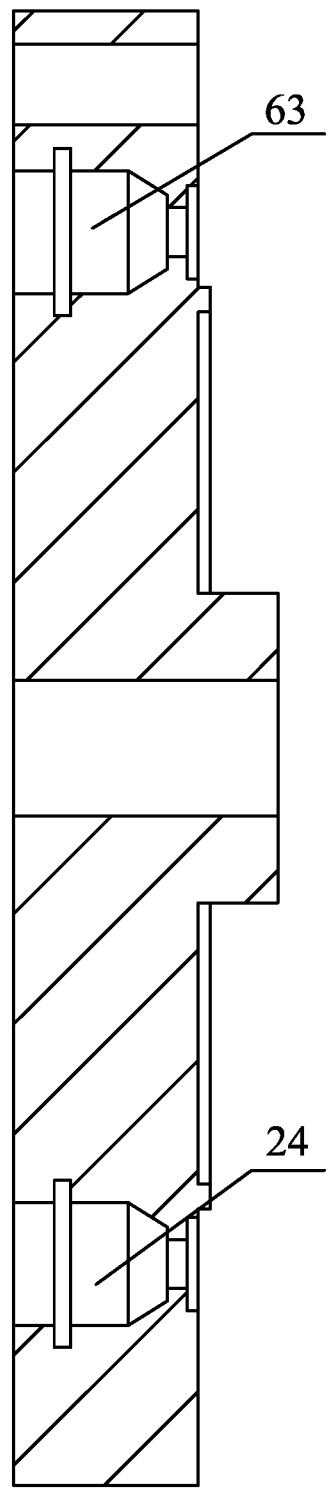
FIG. 4 is a schematic diagram illustrating a section taken along a line B-B shown in FIG. 3.
Figure 5:
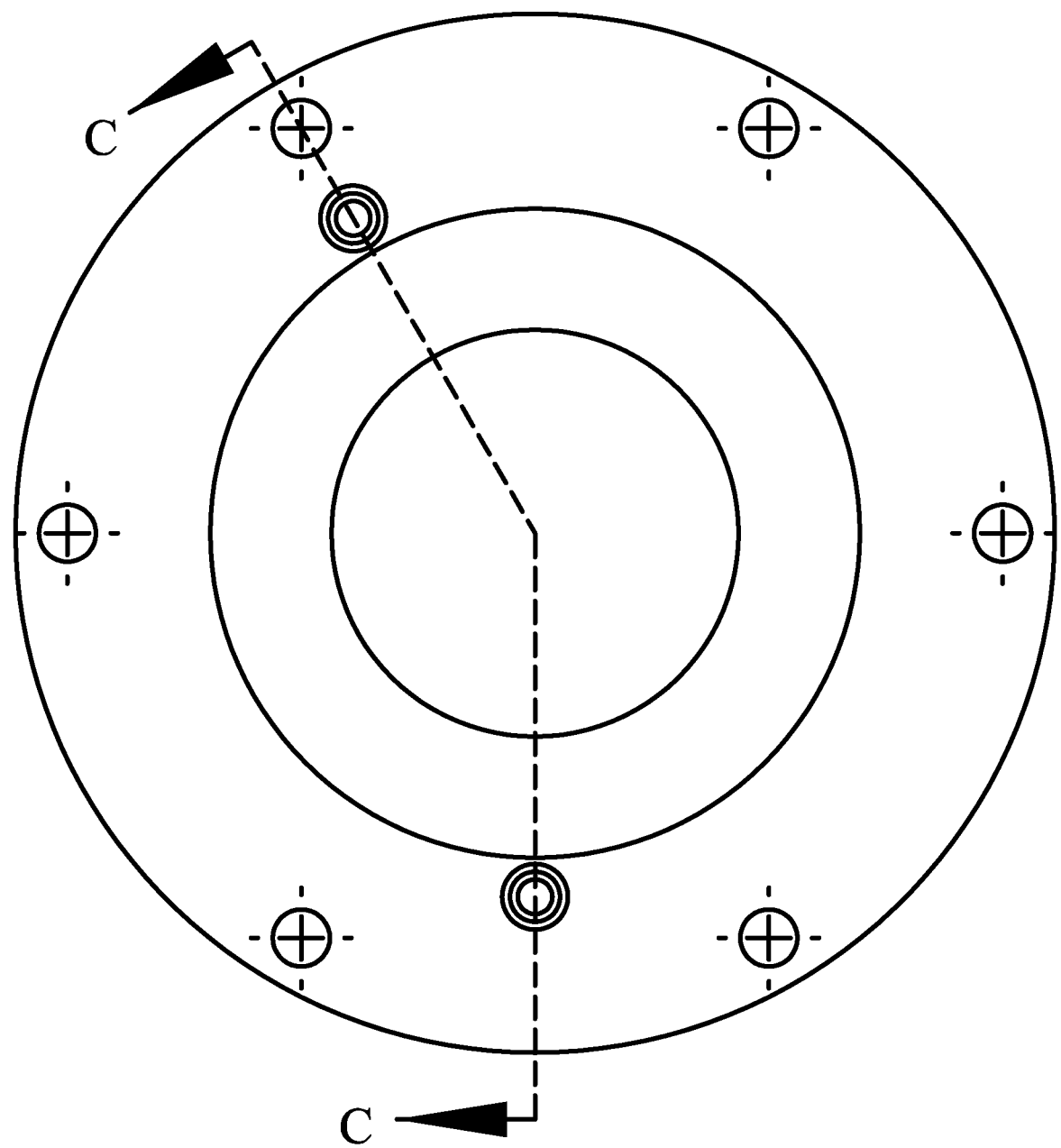
FIG. 5 is a left view of a cylinder body.
Figure 6:
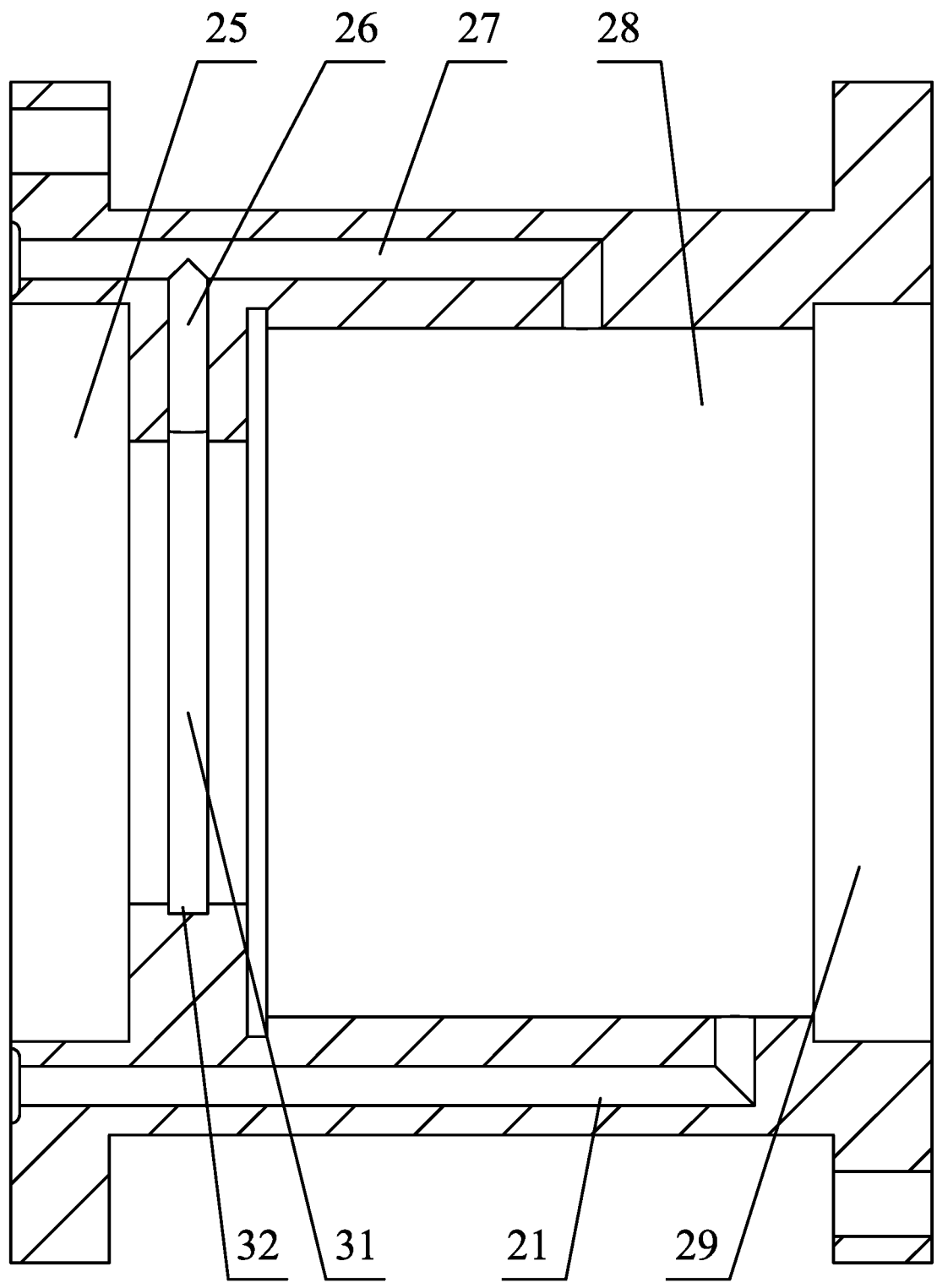
FIG. 6 is a schematic diagram illustrating a section taken along a line C-C shown in FIG. 5.
Figure 7:
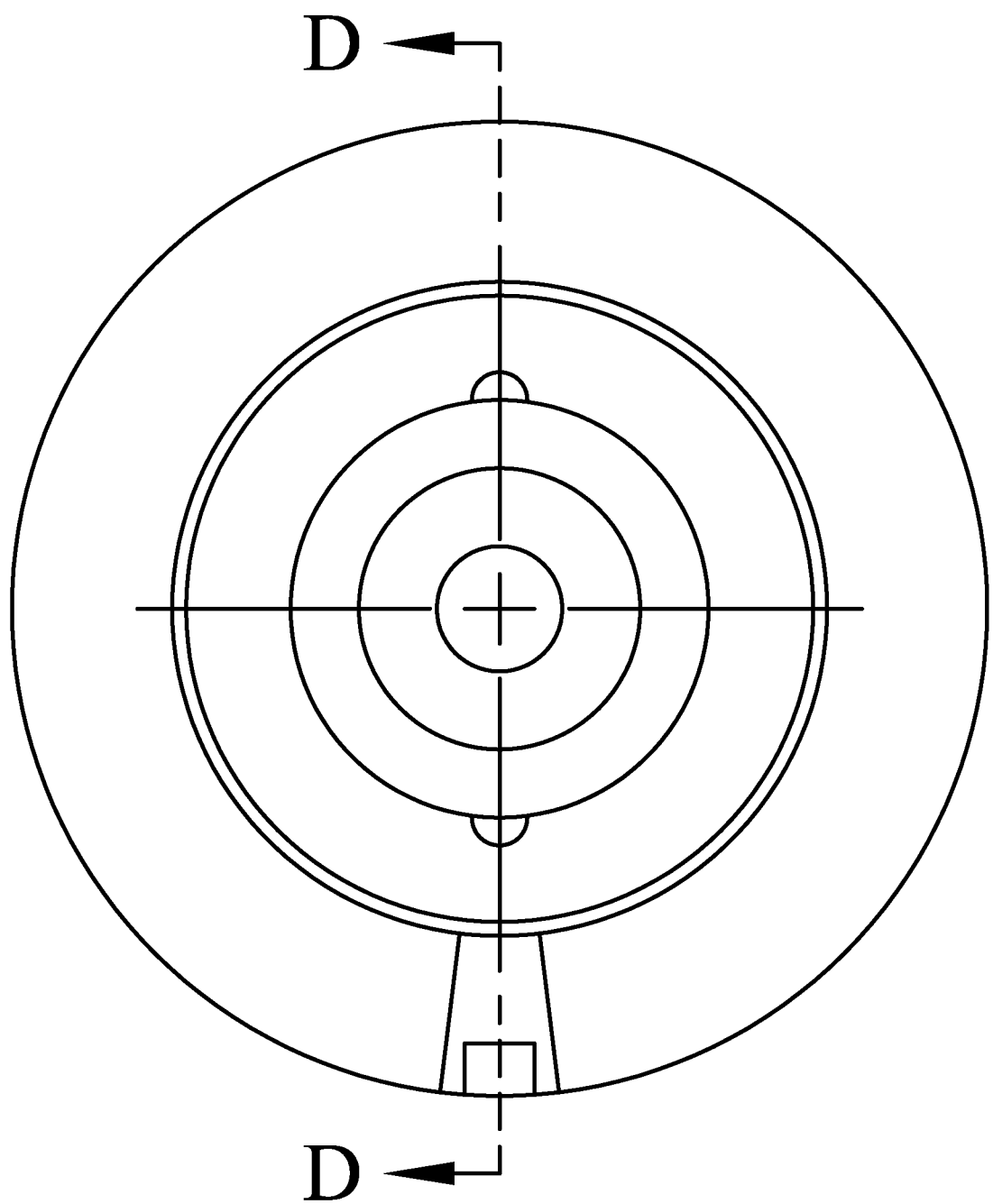
FIG. 7 is a left view of a valve body.

As shown in FIG. 2, FIG. 4 and FIG. 6, a low-pressure oil passage 63 of the left end cover and a high-pressure oil passage 24 of the left end cover are correspondingly arranged on the upper and lower parts of the left end cover 1, an outlet of the low-pressure oil passage 63 of the left end cover is a low-pressure oil outlet T, an inlet of the high-pressure oil passage 24 of the left end cover is a high-pressure oil inlet P, two lines formed by connecting the center of circle of the low-pressure oil passage 63 of the left end cover and the center of circle of the high-pressure oil passage 24 of the left end cover with the center of circle of the left end cover 1 respectively form an angle of 150 degrees.

As shown in FIGS. 2-16, a first low-pressure oil passage 26 of the cylinder body is radially arranged on the upper part of the cylinder body 2, a second low-pressure oil passage 27 of the cylinder body is also axially arranged on the upper part of the cylinder body 2, the first low-pressure oil passage 26 of the cylinder body is in communication with the second low-pressure oil passage 27 of the cylinder body, the second low-pressure oil passage 27 of the cylinder body is in communication with the low-pressure oil passage 63 of the left end cover, and a high-pressure oil passage 21 of the cylinder body in communication with the high-pressure oil passage 24 of the left end cover is axially arranged on the lower part of the cylinder body 2.

As shown in FIGS. 2-16, an inlet of the first low-pressure oil passage 26 of the cylinder body is in communication with an annular low-pressure oil groove 32 of the cylinder body, the annular low-pressure oil groove 32 of the cylinder body is in communication with a first upper oil passage 17 of the valve body and a first lower low-pressure oil passage 23 of the valve body, the upper and lower parts of a first radial oil passage are in communication with a left T port 40 of the valve sleeve respectively, the left T port 40 of the valve sleeve is in communication with a rectangular groove on a first annular boss 48 of the valve core, the rectangular groove on the first annular boss 48 of the valve core is in communication with a left A port 41 of the valve sleeve, the left A port 41 of the valve sleeve communicates with a corresponding first working chamber 54 through a first rectangular valve port 38 of the valve body.

As shown in FIGS. 2-16, an inlet of the second low-pressure oil passage 27 of the cylinder body is in communication with the annular low-pressure oil groove 37 of the valve body, the annular low-pressure oil groove 37 of the valve body is in communication with a second low-pressure oil passage 19 of the valve body, the second low-pressure oil passage 19 of the valve body is in communication with a right T port 47 of the valve sleeve, the right T port 47 of the valve sleeve is in communication with a rectangular groove on a fourth annular boss 51 of the valve core 16, the rectangular groove on the fourth annular boss 51 of the valve core 16 is in communication with a right B port 46 of the valve sleeve, and the right B port 46 of the valve sleeve communicates with a corresponding second working chamber 55 through a second rectangular valve port 39 of the valve body 13.

Figure 11:
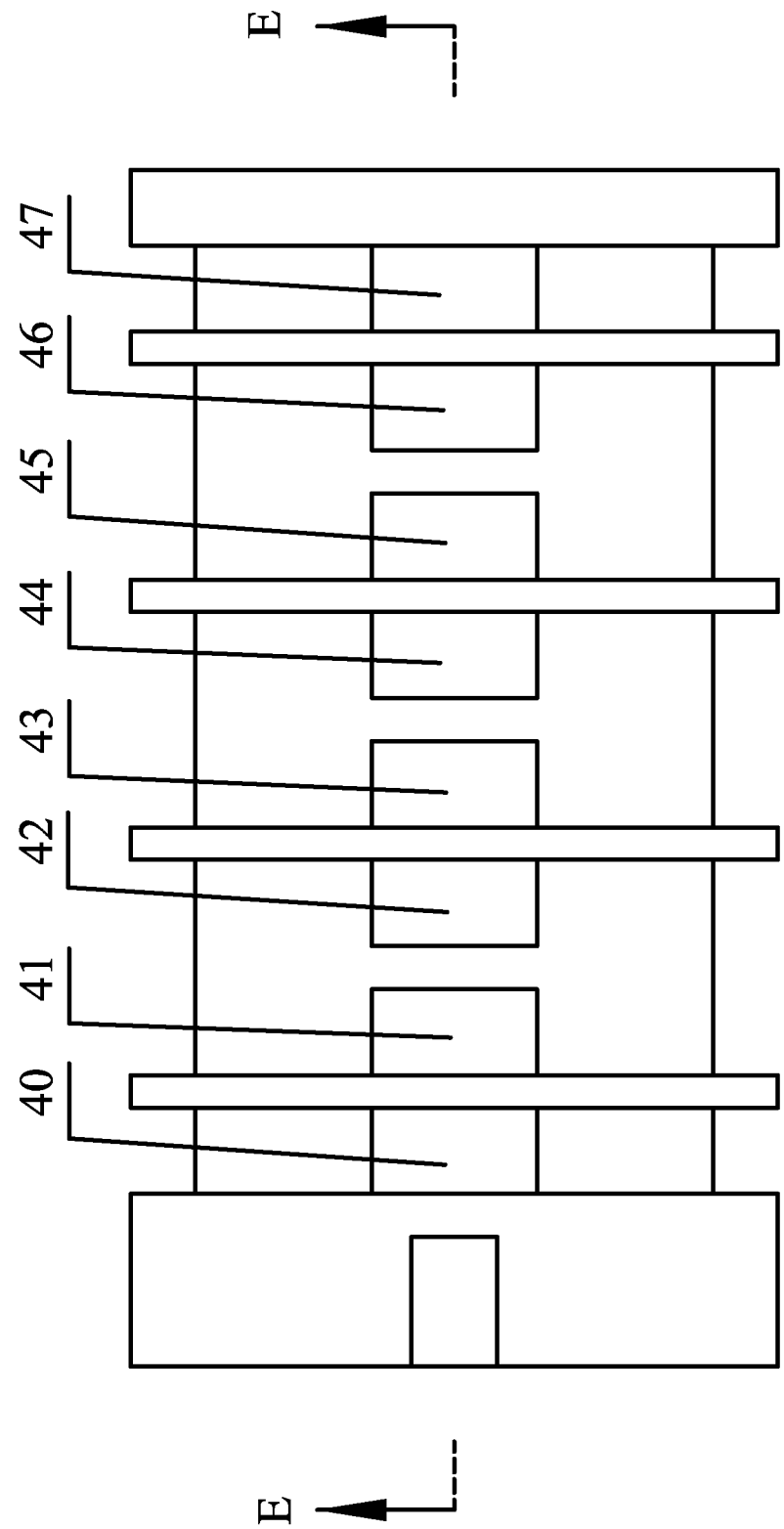
FIG. 11 is a top view of a valve sleeve.
Figure 12:
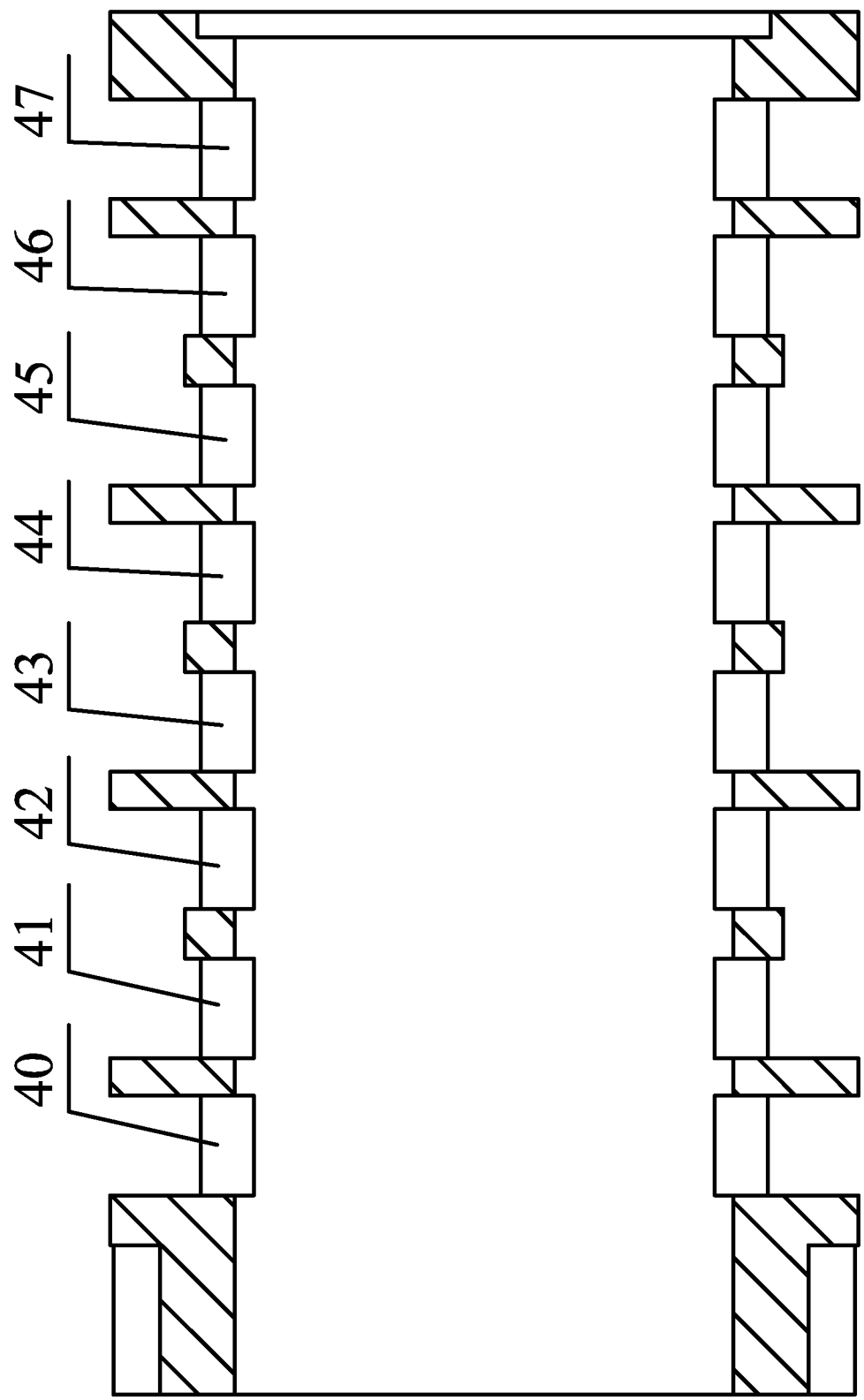
FIG. 12 is a schematic diagram illustrating a section taken along a line E-E shown in FIG. 11.
Figure 13:
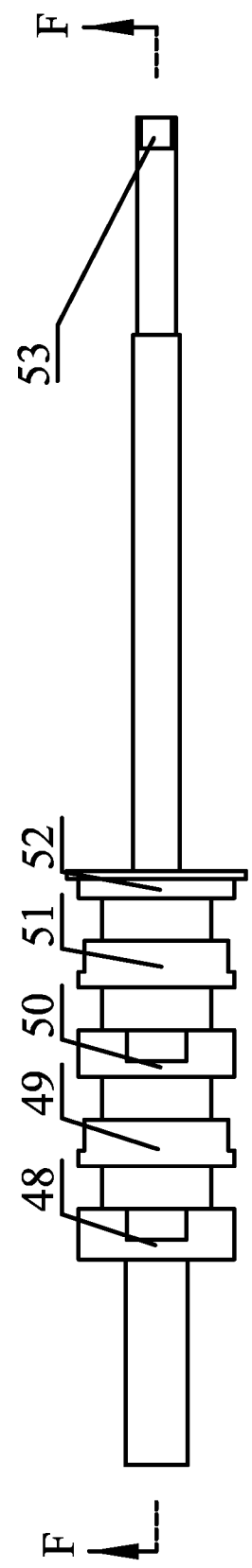
FIG. 13 is a top view of a valve core.

As shown in FIGS. 2-16, an outlet of the high-pressure oil passage 21 of the cylinder body is in communication with the annular high-pressure oil groove 36 of the valve body, the annular high-pressure oil groove 36 of the valve body is in communication with a folding-line-shaped oil passage 20 of the valve body, the folding-line-shaped oil passage 20 of the valve body is in communication with a left P port 43 of the valve sleeve and a right P port 44 of the valve sleeve respectively, the left P port 43 of the valve sleeve is in communication with a rectangular groove on a second annular boss 49 of the valve core, the rectangular groove on the second annular boss 49 of the valve core is in communication with a right A port 42 of the valve sleeve, and the right A port 42 of the valve sleeve is in communication with a corresponding first working chamber 54 through a first rectangular valve port 38 of the valve body; and As shown in FIG. 11 and FIG. 13, the right P port 44 of the valve sleeve is in communication with a rectangular groove on a third annular boss 50 of the valve core, the rectangular groove on the third annular boss 50 of the valve core is in communication with a left B port 45 of the valve sleeve, and the left B port 45 of the valve sleeve is in communication with the corresponding second working chamber 55 through the second rectangular valve port 39 of the valve body.

Figure 9:
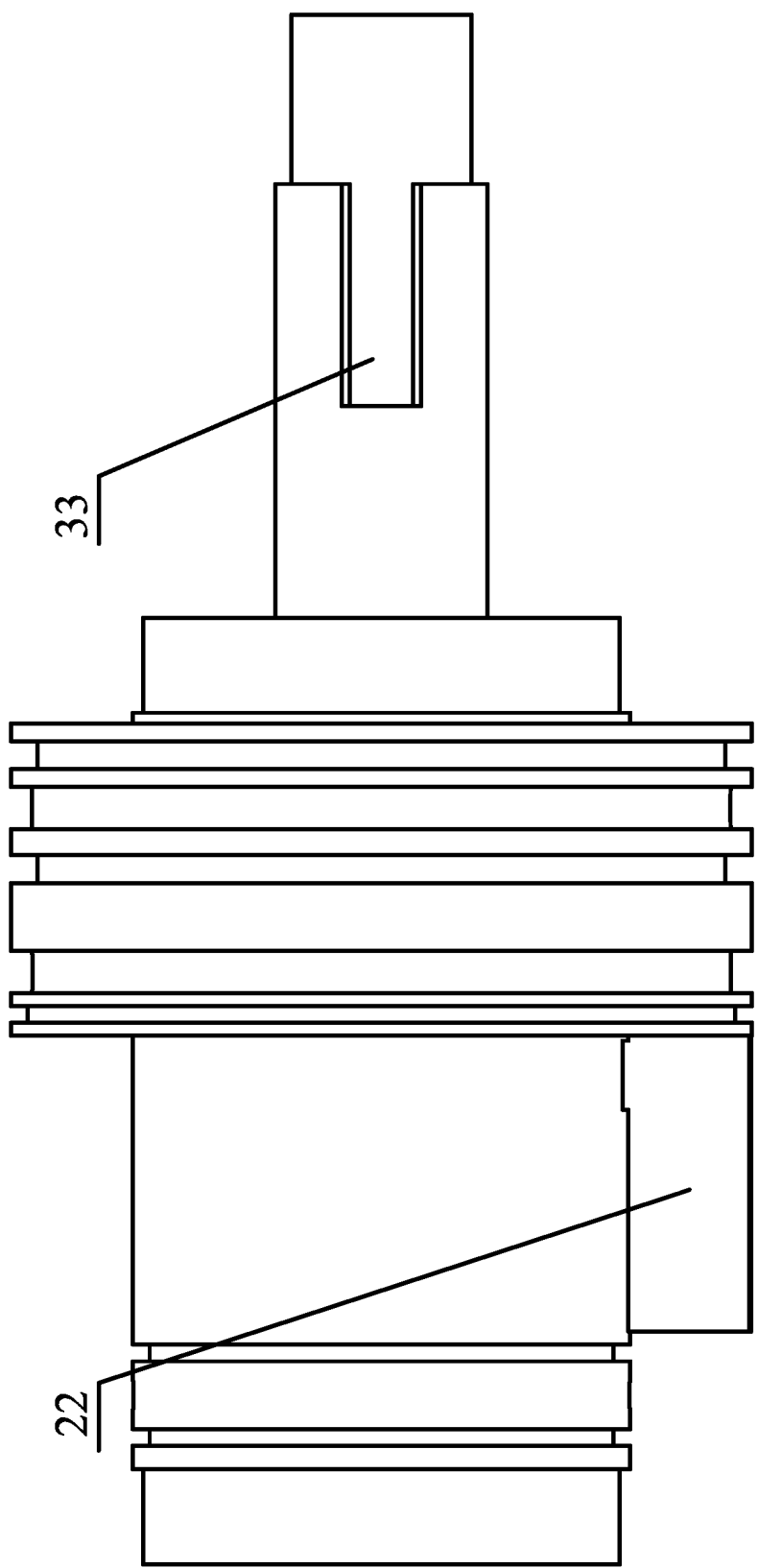
FIG. 9 is a front view of a valve body.
Figure 10:
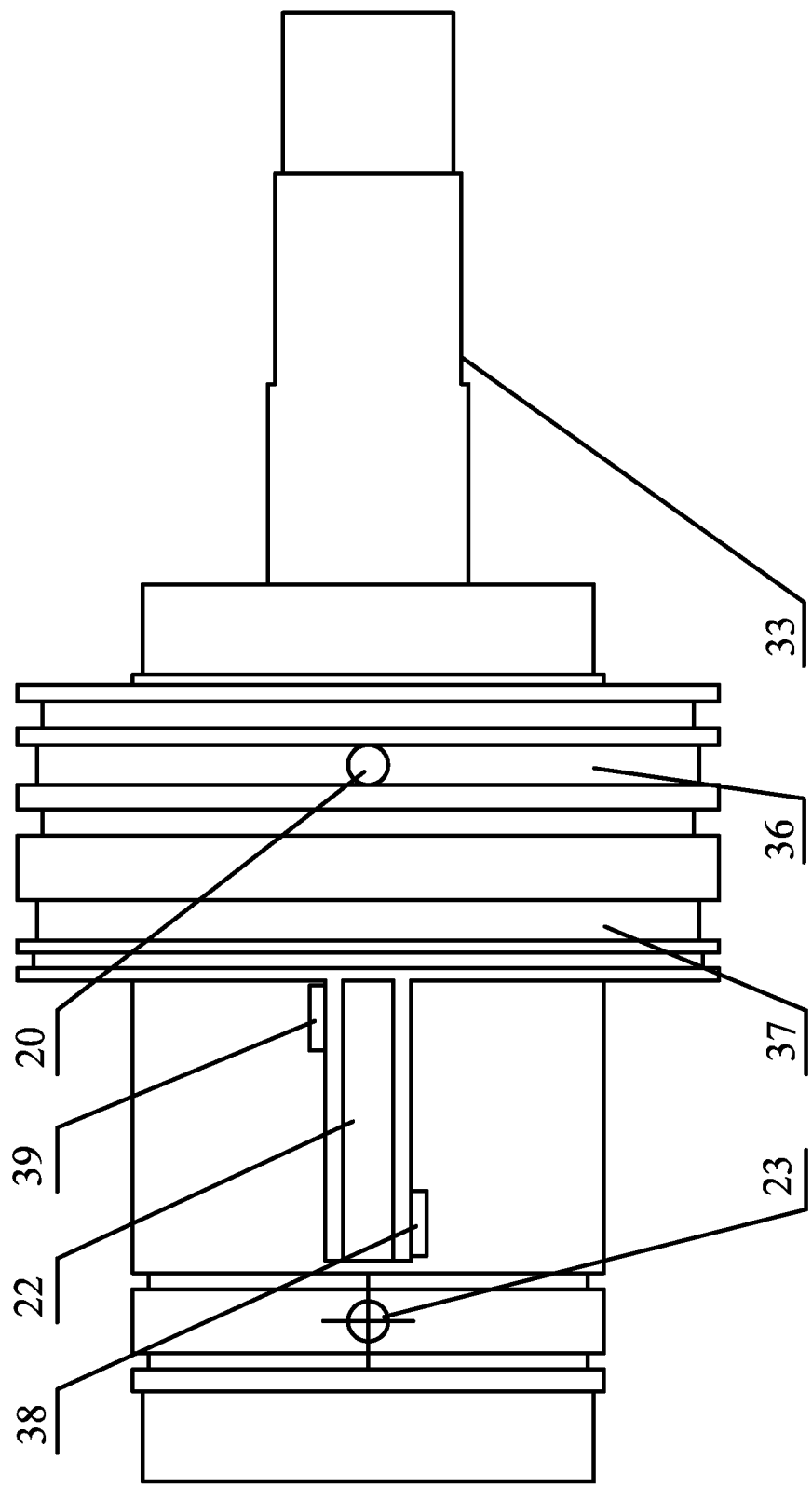
FIG. 10 is a bottom view of a valve body.

As shown in FIG. 9, the valve body 13 comprises a hollow cylinder, a blade 22, a cylindrical boss and a valve body output shaft from left to right; the outer diameter of the cylinder is equal to the inner diameter of a circular hole 31 of the cylinder body in nominal size, the cylindrical hollow chamber 34 of the valve body and a bearing groove 35 of the valve body are opened inside the cylinder, the inner diameter of the cylindrical hollow chamber 34 of the valve body is equal to the outer diameter of the valve sleeve 3 in nominal size, two semicircular cylindrical pin holes having the same size are opened on the left end of the cylindrical hollow chamber 34 of the valve body, the two pin holes are distributed to form an angle of 180 degrees, two valve body sealing grooves are opened on a cylindrical surface at the left end of the cylinder, the annular low-pressure oil groove 32 of the cylinder body is located between two sealing grooves at the left end of the valve body 13, and the first upper oil passage 17 of the valve body and the first lower low-pressure oil passage 23 of the valve body are arranged between the sealing grooves.

The blade 22, the length of which is equal to a difference between the length of the cylindrical hollow chamber 28 of the cylinder body and the length of the cylindrical boss of the valve body 13, is arranged on the lower part of the outer wall of the cylinder body; the difference between radians of upper and lower cambered surfaces of the blade 22 is half of a difference between the inner diameter of the cylindrical hollow chamber 28 of the cylinder body and the outer diameter of the cylinder of the valve body 13; a strip-shaped sealing groove is axially arranged in the center of the lower cambered surface of the blade, and the strip-shaped sealing groove having the same length as the blade 22 is embedded with a blade sealing strip.

The outer diameter of the cylindrical boss is equal to the inner diameter of the cylindrical hollow chamber 28 of the cylinder body in nominal size, a cylindrical surface of the cylindrical boss is provided with three valve body sealing grooves, the annular low-pressure oil groove 37 of the valve body and the second low-pressure oil passage 19 of the valve body are arranged between the left and middle valve body sealing grooves; and the annular high-pressure oil groove 36 of the valve body and the folding-line-shaped oil passage 20 of the valve body are arranged between the middle and right valve body sealing grooves.

The second rectangular valve port 39 is arranged on a hollow cylinder close to the cylindrical boss, the first rectangular valve port 38 is arranged on a hollow cylinder close to the left valve body sealing groove, and the first rectangular valve port 38 has the same size as the second rectangular valve port 39.

A plain line at the opening of the folding-line-shaped oil passage 20 of the valve body is located in exact middle between a plain line of the center of the second rectangular valve port 39 a plain line of the center of the first rectangular valve port 38, and an angle formed by the plain line of the center of the second rectangular valve port 39 and the plain line of the center of the first rectangular valve port 38 is θ which is calculated according to the following formula:

$$\theta = \frac{b_1 + b_2}{r} \quad (1)$$

where b1 represents the arc length of the inner wall of the blade, b2 represents the arc length of a rectangular valve port on a hollow cylinder, and r represents the outer diameter of the hollow cylinder; a through hole is concentrically arranged inside the valve body 13, the diameter of the through hole is slightly greater than the diameter of the valve core torque transfer shaft 66, the left end of the through hole is in communication with the valve body bearing groove 35; and two concave spigots 33 of the valve body are centrically symmetrically arranged on the outer wall of the right end of the output shaft.

Figure 8:
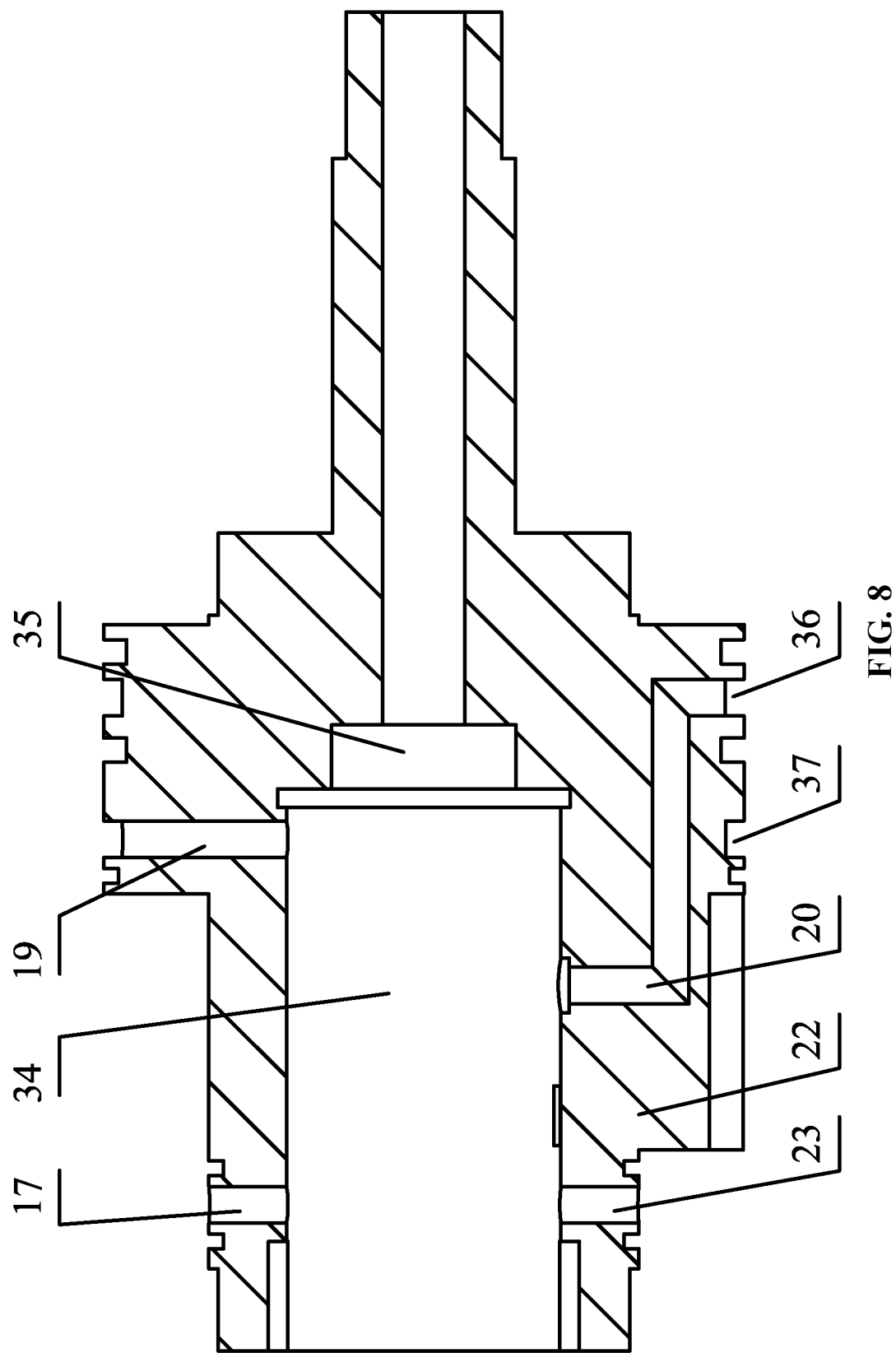
FIG. 8 is a schematic diagram illustrating a section taken along a line D-D shown in FIG. 7.

As shown in FIG. 8, a through hole is concentrically arranged inside the valve body 13, the through hole has a diameter slightly greater than that of valve core torque transfer shaft 66, the left end of the through hole is in communication with the valve body bearing groove 35, two concave spigots 33 of the valve body are centrally symmetrically arranged on the outer wall of the right end of the output shaft, inner thread is opened at inner side of the through hole of the right end of the valve body 13, the nut 8 is internally hollow and is in clearance fitting with valve core torque transfer shaft 66, outer thread of the nut is in engaged connection with thread at inner side of the valve body 13 so that the nut 8 can be fixed at the right end of the valve body 13 and axial limitation is performed for a bearing and a follow-up disk mounted at outer wall of the valve body 13 by an outer end of the nut.

Figure 14:
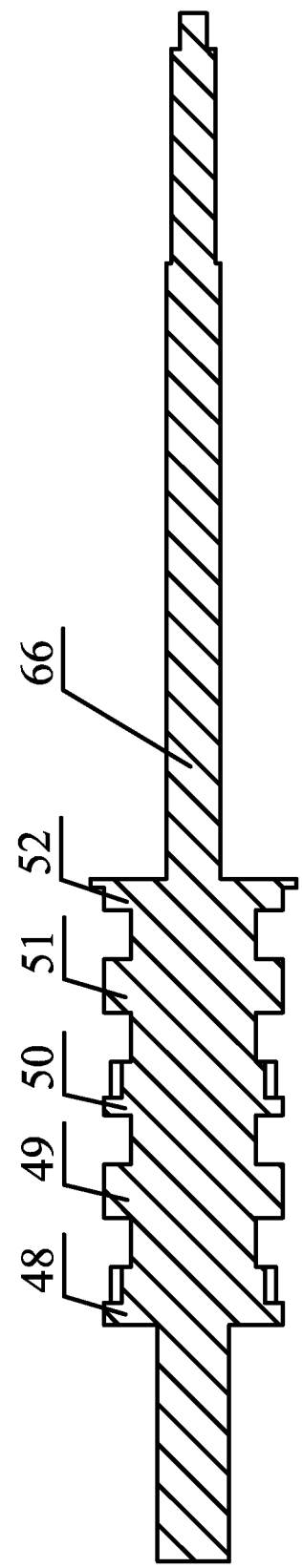
FIG. 14 is a schematic diagram illustrating a section taken along a line F-F shown in FIG. 13.
Figure 15:
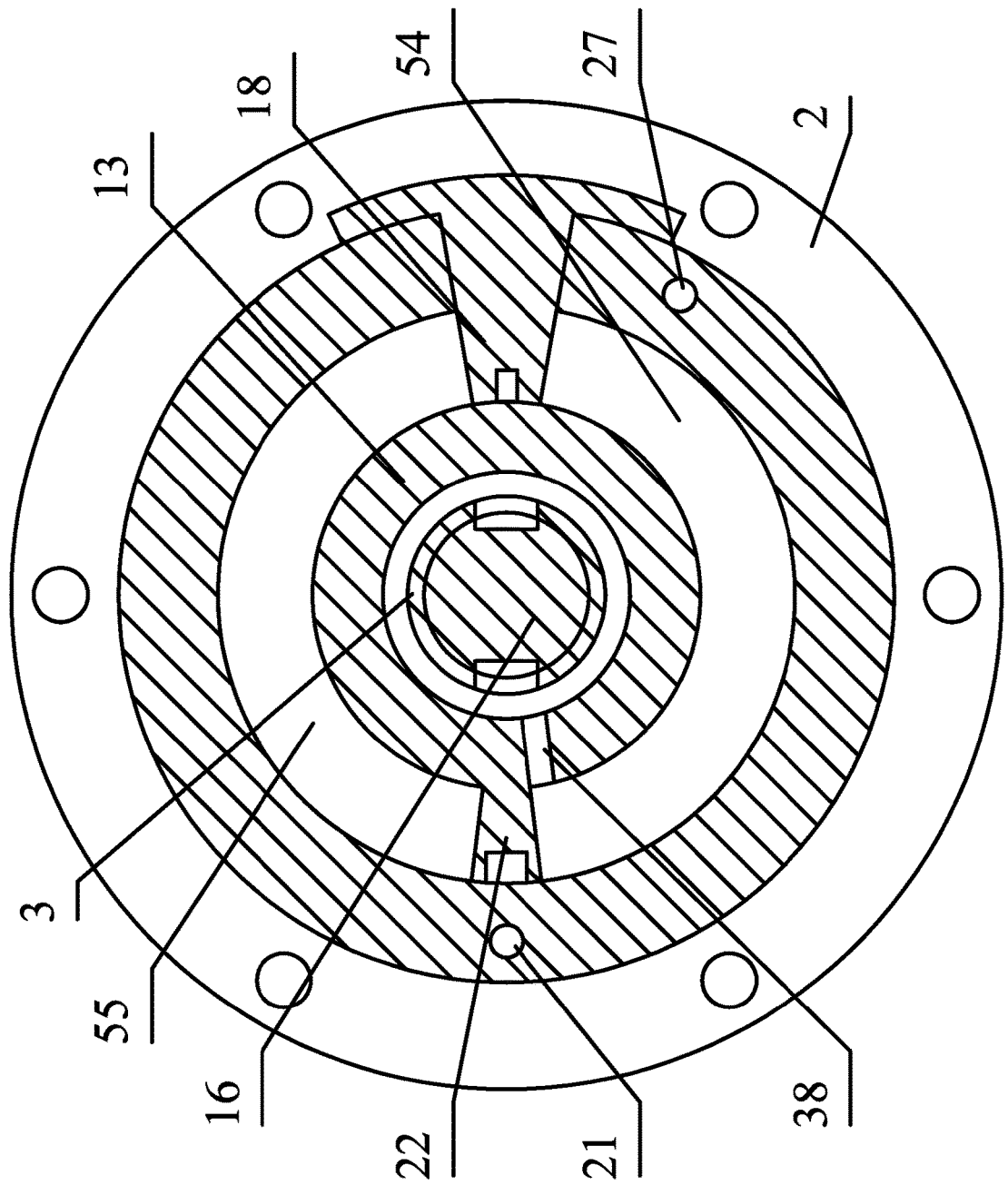
FIG. 15 is a schematic diagram illustrating a section taken along a line G-G shown in FIG. 1.
Figure 16:
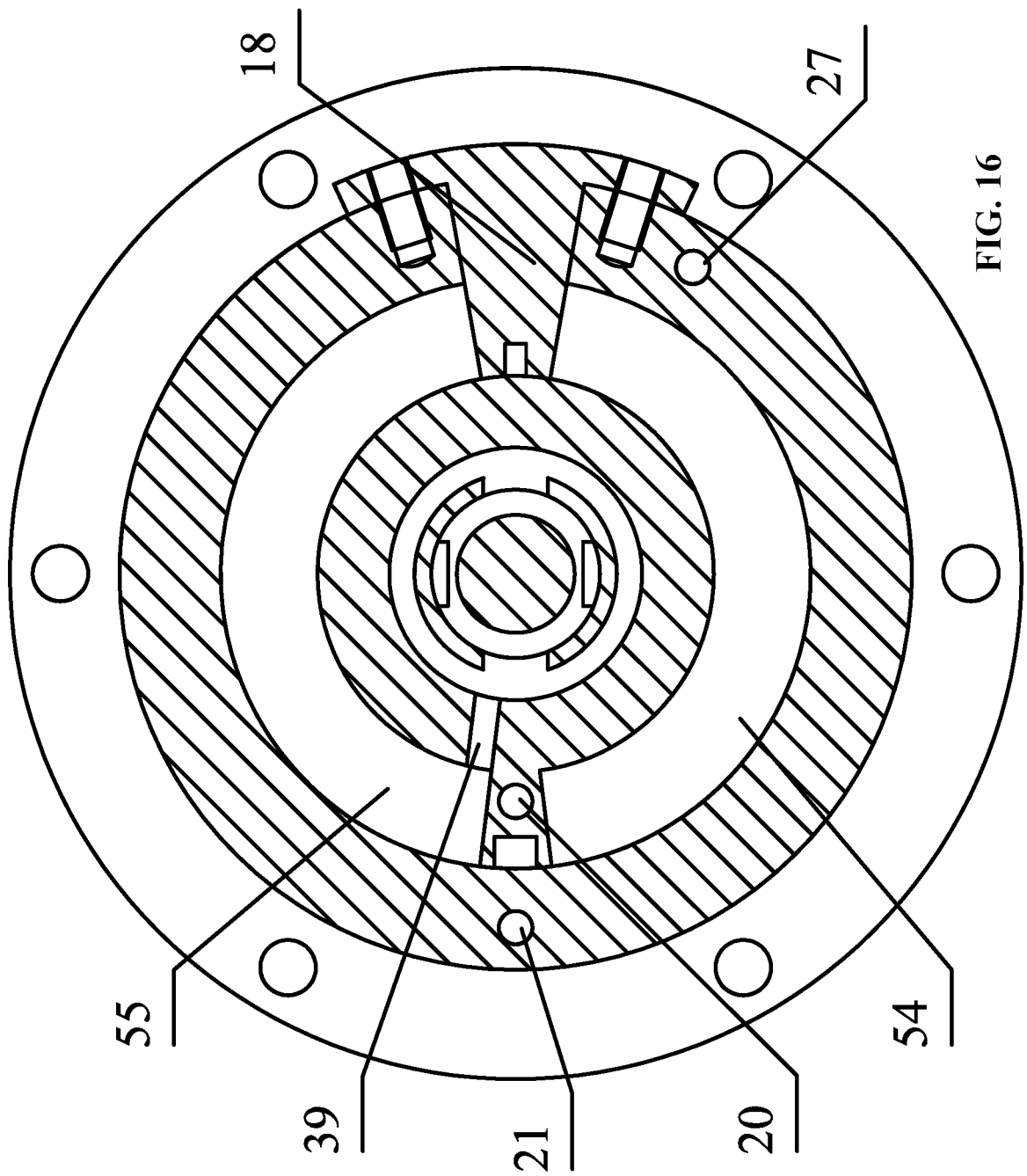
FIG. 16 is a schematic diagram illustrating a section taken along a line H-H shown in FIG. 1.
Figure 17:
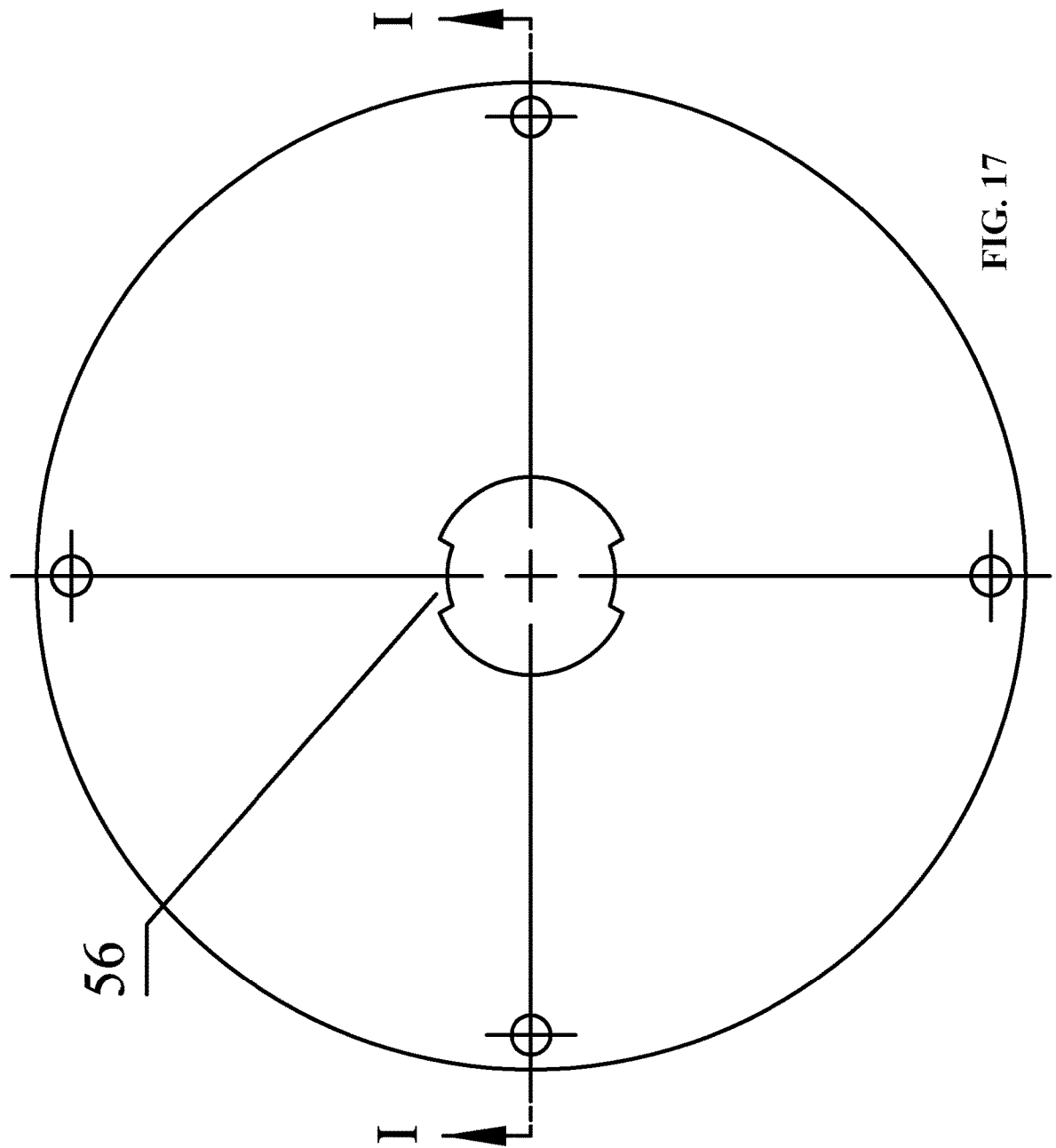
FIG. 17 is a left view of a tray.
Figure 18:
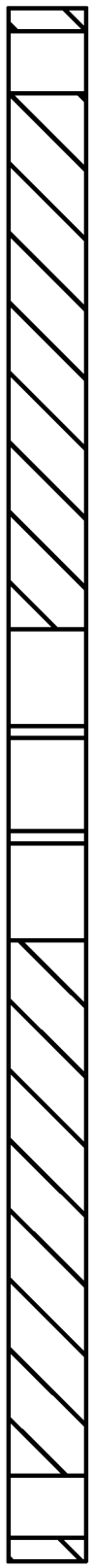
FIG. 18 is a schematic diagram illustrating a section taken along a line I-I shown in FIG. 17.
Figure 19:
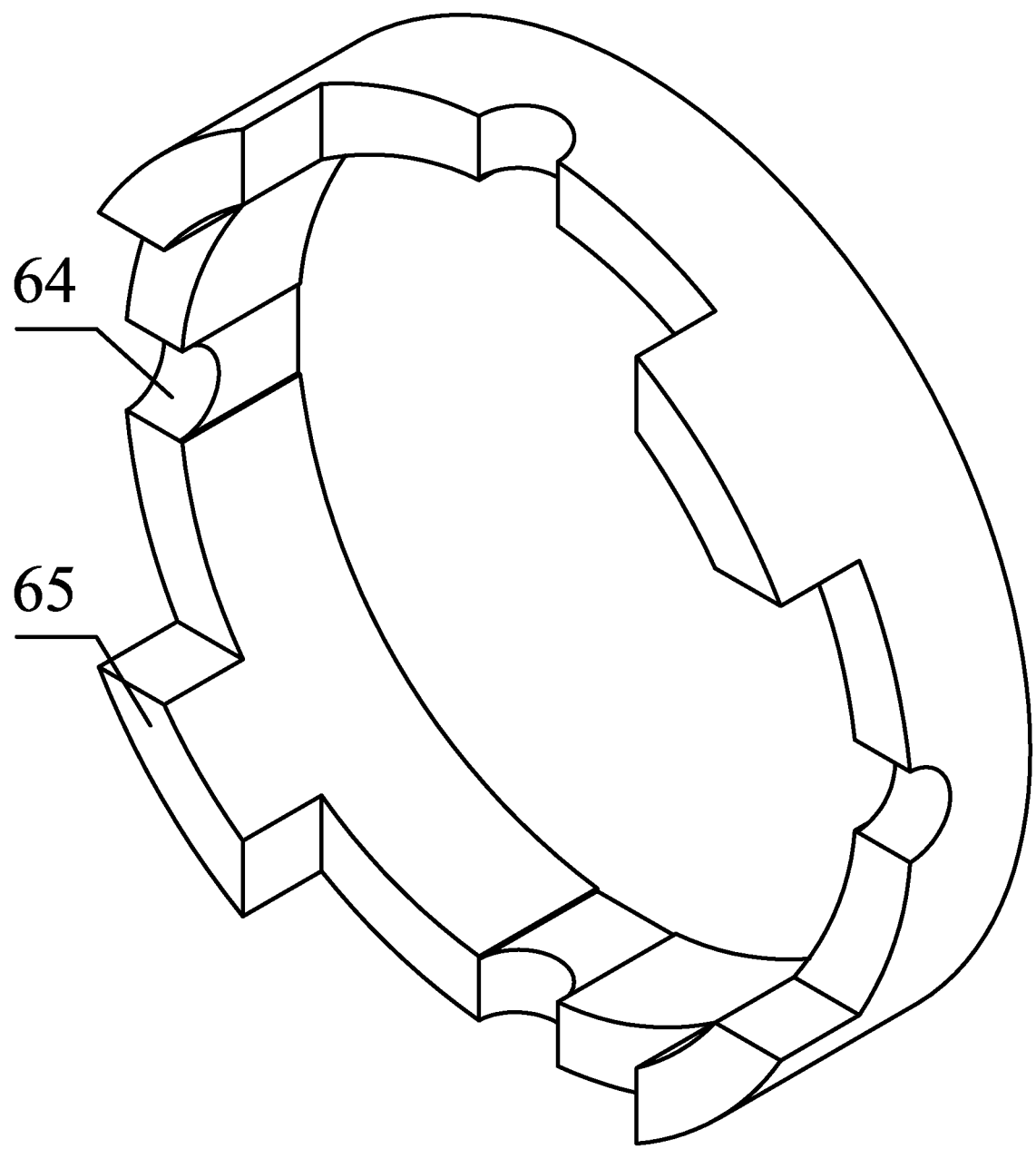
FIG. 19 is a schematic diagram illustrating a stereoscopic structure of a stabilizing ring.

As shown in FIG. 13 and FIG. 14, the valve core is provided from left to right with a cylinder, a first annular boss 48, a second annular boss 49, a third annular boss 50, a fourth annular boss 51, a fifth annular boss 52 and a valve core torque transfer shaft 66. The right side of each of the first annular boss 48, the second annular boss 49, the third annular boss 50 and the fourth annular boss 51 is provided with two rectangular grooves of the same size which are distributed to form an angle of 180 degrees, each two rectangular grooves are on the same circumferential line; the center line of the two rectangular grooves of the first annular boss 48 and the center line of the two rectangular grooves of the third annular boss 50 are respectively located on two plain lines with two axis centers being symmetrical. The center line of the two rectangular grooves of the second annular boss 49 and the center line of the two rectangular grooves of the fourth annular boss 51 are respectively located on another two plain lines with two axis centers being symmetrical, and every two adjacent plain lines differ from each other by 90 degrees.

A cylinder is concentrically arranged on the left end of the valve core 16; the diameter of the cylinder is equal to the inner diameter of the left thrust ball bearing 14 but slightly smaller than the diameter of a central hole of the left end cover 1; the right end of the valve core 16 is provided with the valve core torque transfer shaft 66; the diameter of the valve core torque transfer shaft 66 is slightly smaller than the diameter of a through hole at the right end of the valve body 13 but equal to the inner diameter of the right thrust ball bearing 14, and a convex spigot 53 is arranged at the right end of the valve core torque transfer shaft 66.

As shown in FIG. 11 and FIG. 12, the valve sleeve 3 comprises six annular bosses and five grooves, and the annular bosses and the grooves are alternatively arranged; the annular boss at the left end of the valve sleeve is provided with two semicircular cylindrical pin holes arranged to form an angle of 180 degrees; two rectangular openings arranged to form an angle of 180 degrees are arranged on each of a first groove and a fifth groove; the two rectangular openings on the first groove constitute the left T port 40 of the valve sleeve, and the two rectangular openings on the fifth groove constitute the right T port 40 of the valve sleeve; the left and right sides of each of the three grooves in the middle of the valve sleeve 3 are respectively provided with a group of rectangular openings and each group of the rectangular openings comprises two rectangular openings arranged to form an angle of 180 degrees; the rectangular openings on the five grooves have the same size; the center lines of the rectangular openings on each of the five grooves are located on the same respective corresponding plain lines, and the rectangular openings on the five grooves have the same size as the rectangular grooves on the four bosses on the valve core 16.

The left side faces of each group of rectangular openings arranged on the left side of each of the three middle grooves of the valve sleeve 3 are on the same plane as the right side face of an adjacent annular boss, and the right side faces of each group of rectangular openings on the right side of each of the three middle grooves are on the same plane as the left side face of an adjacent annular boss. The six groups of rectangular openings in the middle of the valve sleeve 3 are the left A port 41 of the valve sleeve, the right A port 42 of the valve sleeve, the left P port 43 of the valve sleeve, the right P port 44 of the valve sleeve, the left B port 45 of the valve sleeve and the right B port 46 of the valve sleeve in sequence from left to right.

As shown in FIG. 11 and FIG. 12, the fixing stopper block 18 is divided into an upper arc-shaped stopper sheet and a lower arc frustum stopper block, the axial length of the upper part of the fixing stopper block is equal to a difference between the length of the cylindrical hollow chamber 28 of the cylinder body and the length of the cylindrical boss of the valve body 13, a difference between radians of an upper and lower cambered surfaces of the lower arc frustum of the fixing stopper block is half of a difference between the outer diameter of the cylinder body 2 and outer diameter of the cylinder of the valve body 13; a strip-shaped sealing groove is axially arranged in the center of the lower cambered surface of the fixing stopper block 18, and the strip-shaped sealing groove having the same length as the fixing stopper block 18 is embedded with a stopper block sealing strip.

Figure 20:
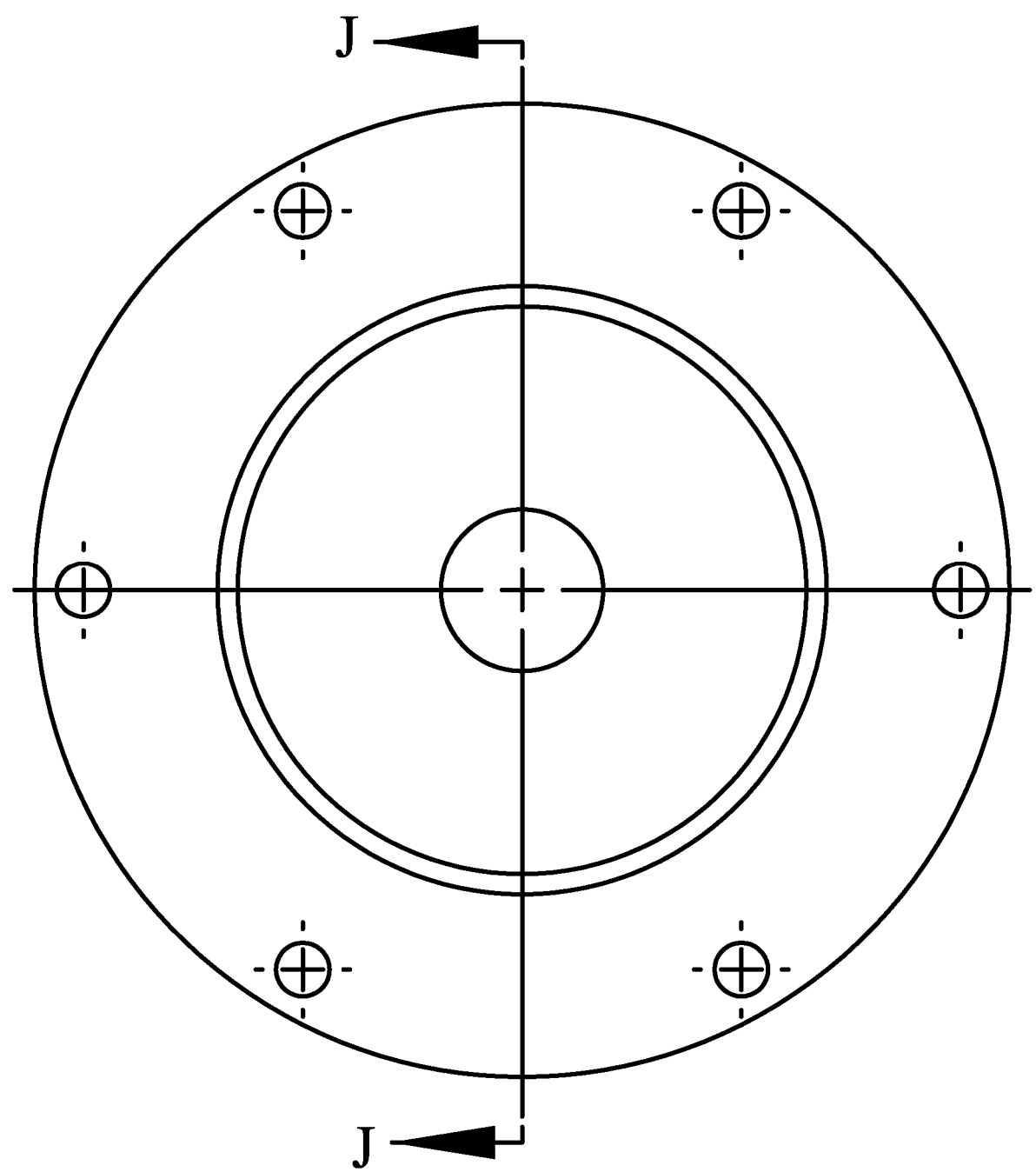
FIG. 20 is a left view of a right end cover.
Figure 21:
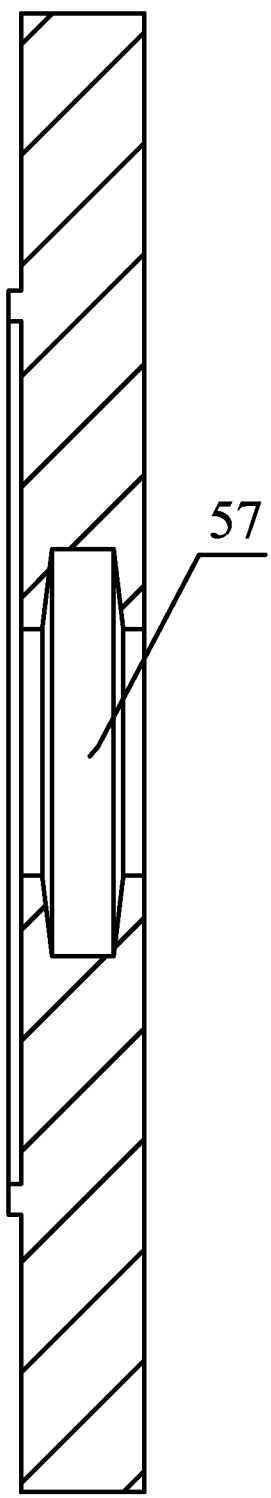
FIG. 21 is a schematic diagram illustrating a section taken along a line J-J shown in FIG. 20.

As shown in FIG. 1, FIG. 20 and FIG. 21, annular sealing strip grooves 57 are radially symmetrically opened on both sides of the circular hole in the center of the right end cover 12 and are embedded insides with a circular sealing strip.

As shown in FIG. 1, FIG. 17, FIG. 18 and FIG. 19, the tray mechanism is formed by connecting the disk-shaped tray 11 and the stabilizing ring 4 through a bolt, a through hole is opened in the center of the tray 11, two convex spigots 56 of the tray are symmetrically arranged on the through hole, the convex spigot 56 of the tray corresponds in position to the concave spigot 33 on the output shaft of the valve body 13; the right end of the stabilizing ring 4 is provided with four wheel grooves 64 symmetrically arranged at a same spacing in a circumferential direction and four stopper blocks 65 symmetrically arranged at a same spacing in a circumferential direction, and each of the stopper blocks 65 and an adjacent wheel groove 64 are arranged to form an angle of 45 degrees.

Figure 22:
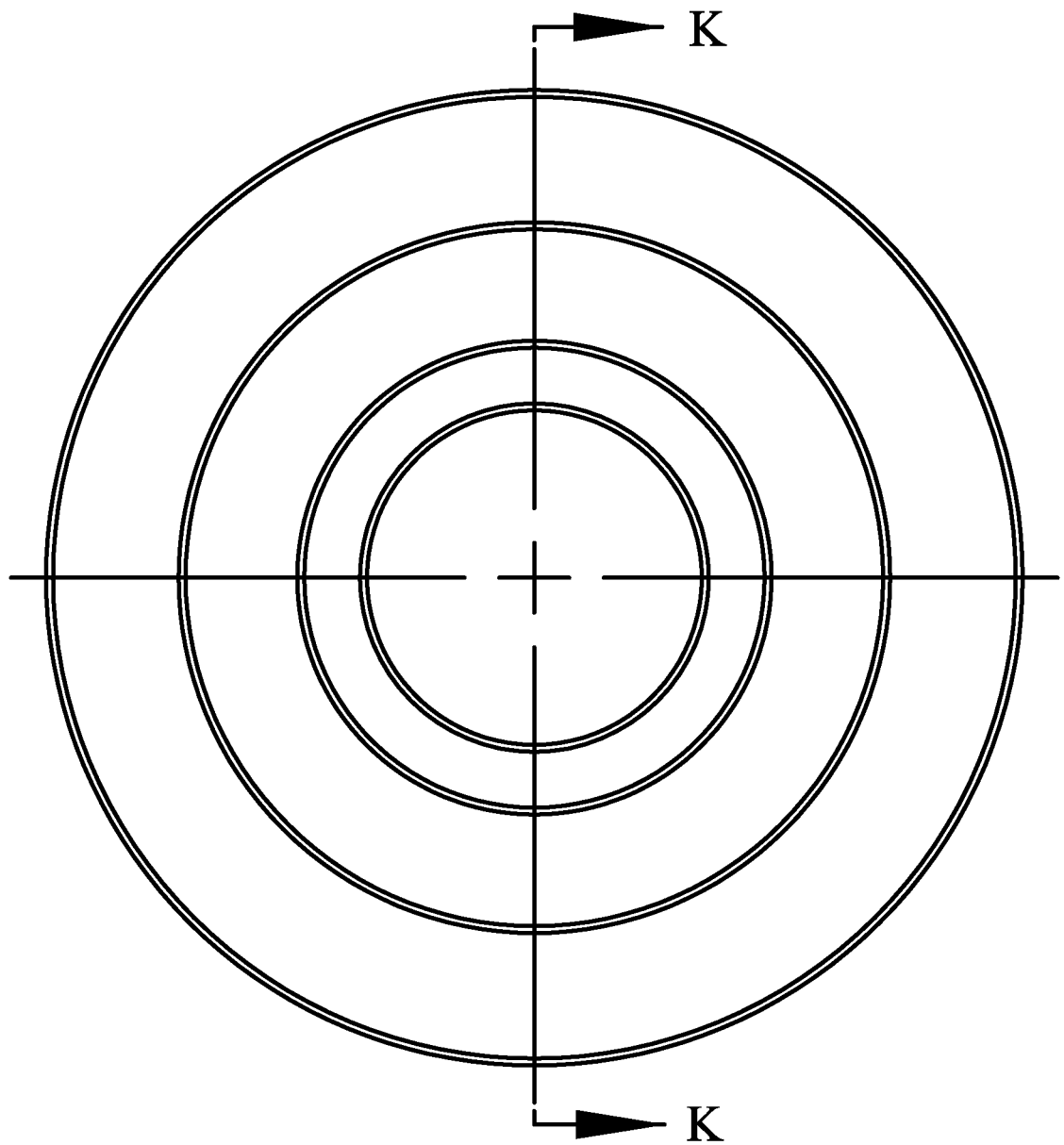
FIG. 22 is a right view of a follow-up ring.
Figure 23:
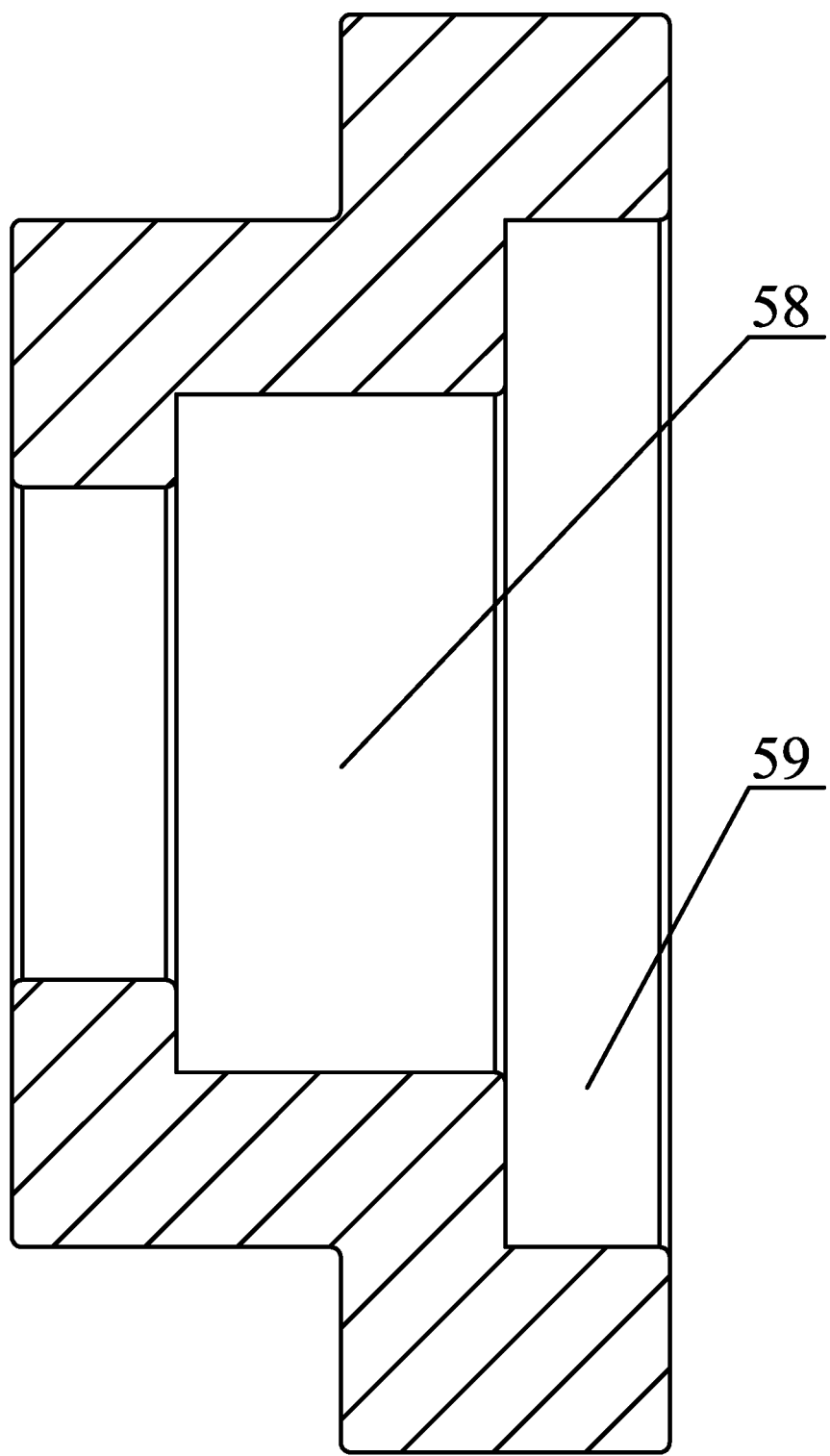
FIG. 23 is a schematic diagram illustrating a section taken along a line K-K shown in FIG. 22.

As shown in FIG. 22 and FIG. 23, the follow-up disk 5 is a stepped cylinder, the inside of the follow-up disk 5 is divided into three cylindrical chambers comprising a left chamber, a middle first cylindrical hollow chamber 58 and a right second cylindrical hollow chamber 59, the diameter of the first cylindrical hollow chamber 58 is equal to the circumferential diameter of the outer wall of the deep groove ball bearing 6, the length of the first cylindrical hollow chamber 58 is equal to the sum of the lengths of the two deep groove ball bearings 6, the diameter of the second cylindrical hollow chamber 59 is greater than the diameter of the first cylindrical hollow chamber 58, and the length of the second cylindrical hollow chamber 59 is equal to a distance from the right end of the first cylindrical hollow chamber 58 to the left end of the torque transfer disk 7.

Figure 24:
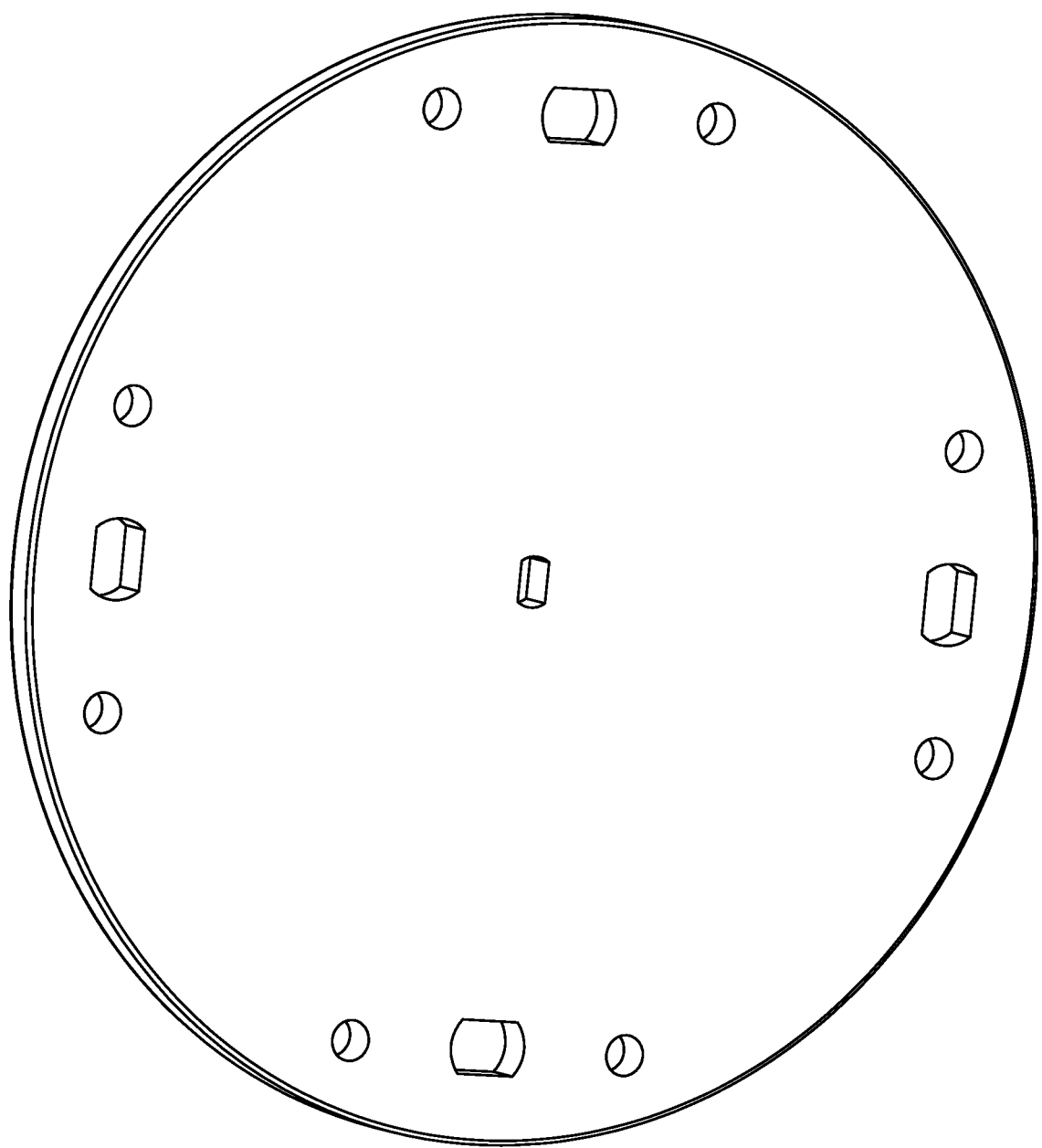
FIG. 24 is a view of a stereoscopic structure of a torque transfer disk.

As shown in FIG. 24, the torque transfer disk 7 is in the shape of a disk having a concave spigot in the center of the disk, four pairs of bolt holes and four concave spigots are centrally symmetrically arranged in a circumferential direction on the torque transfer disk 7 and each pair of bolt holes are symmetrically distributed on both sides of one concave spigot.

Figure 25:
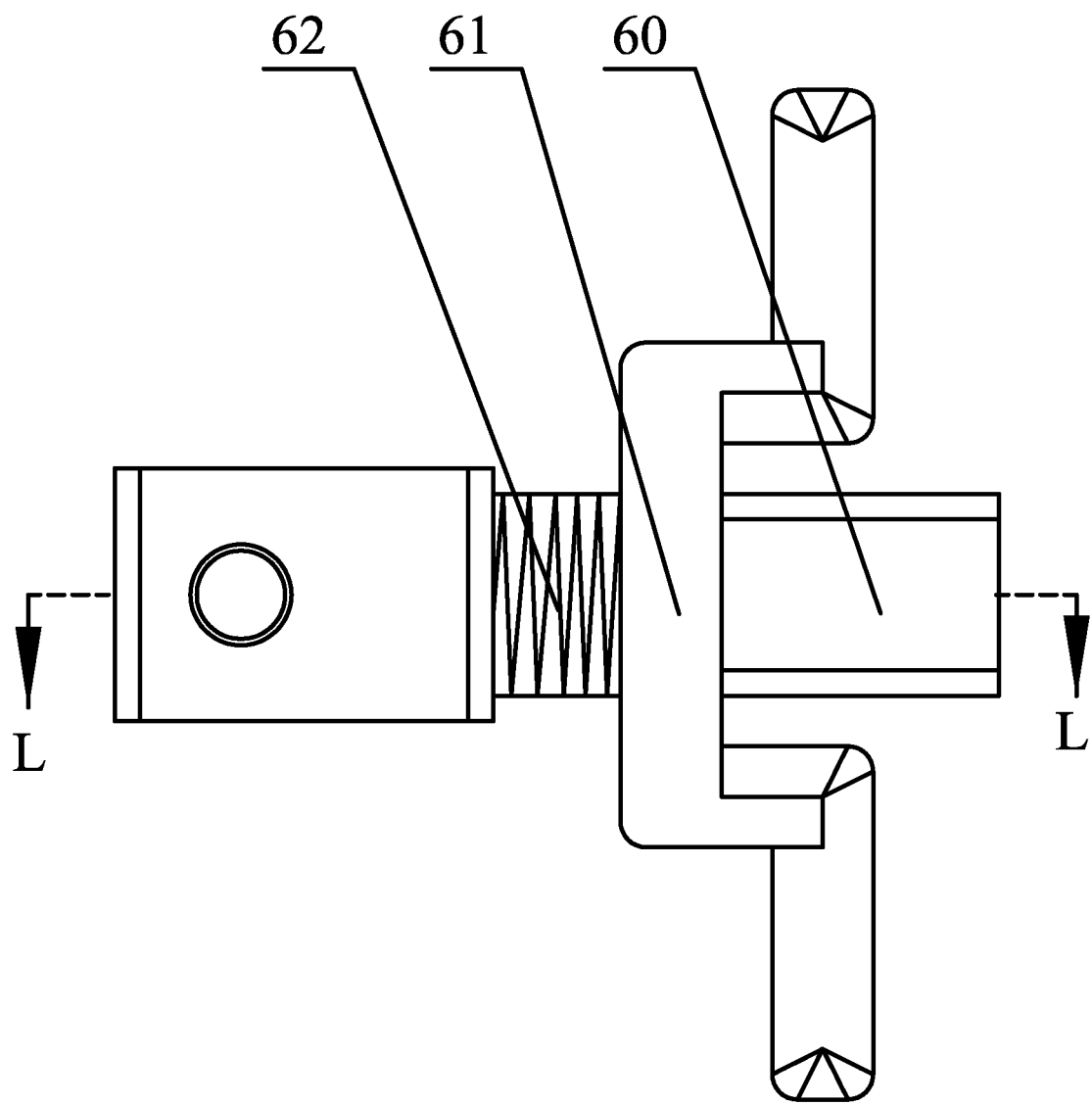
FIG. 25 is a schematic diagram illustrating a structure of a stable supporting wheel mechanism.
Figure 26:
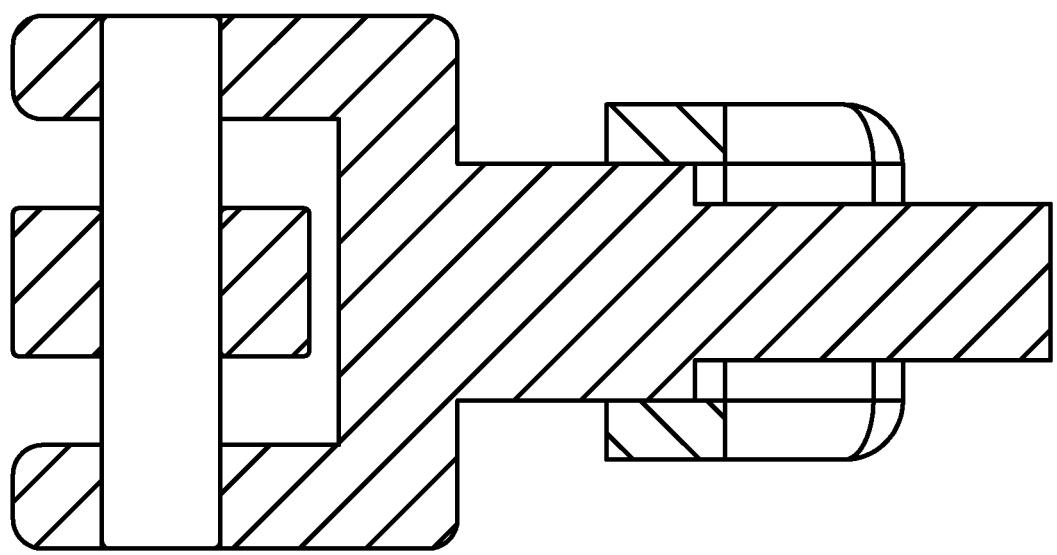
FIG. 26 is a schematic diagram illustrating a section taken along a line L-L shown in FIG. 25.
Figure 27:
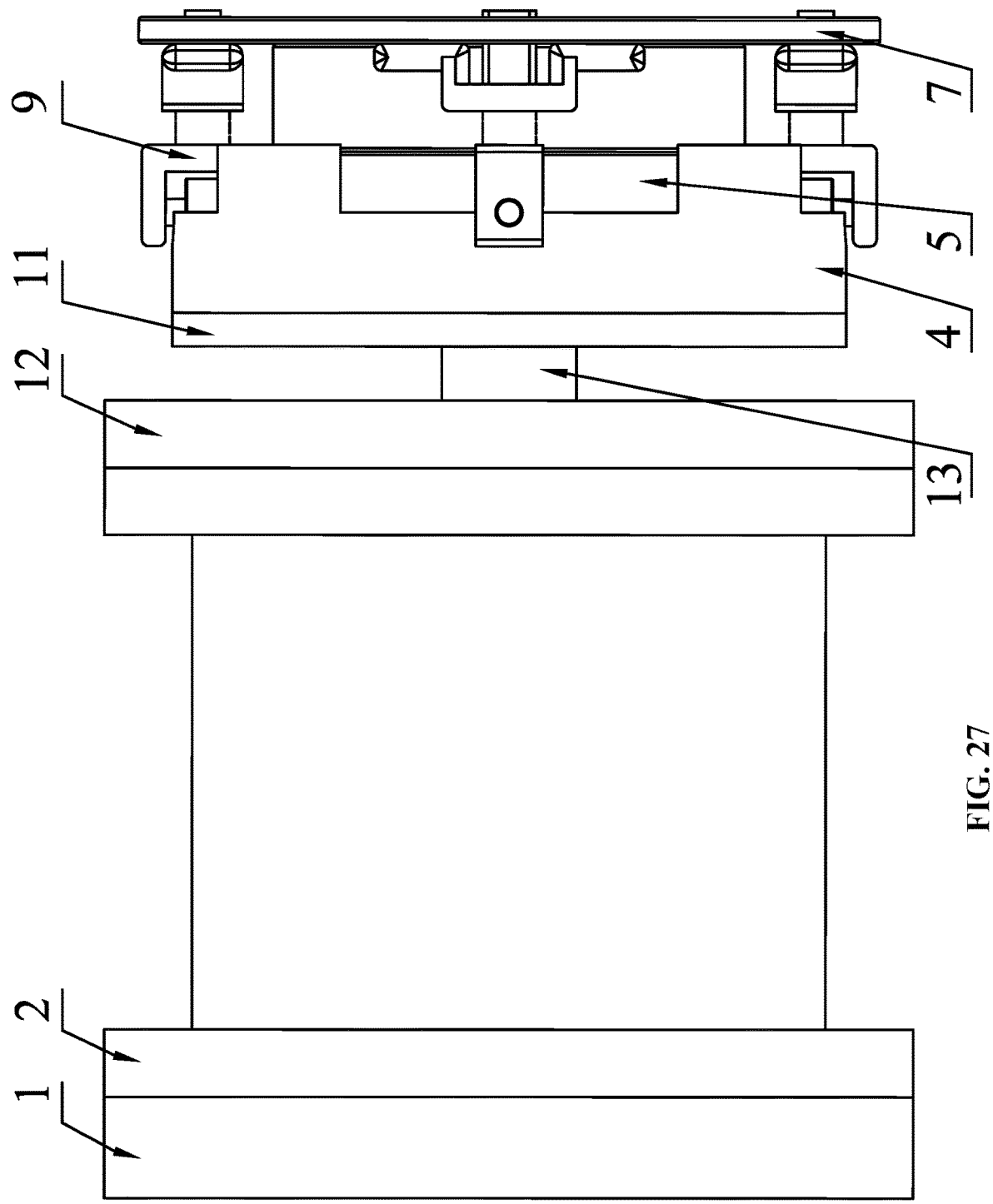
FIG. 27 is a sketch drawing of a passive follow-up hydraulic rotary joint for a robot according to an example of the disclosure.
Figure 28:
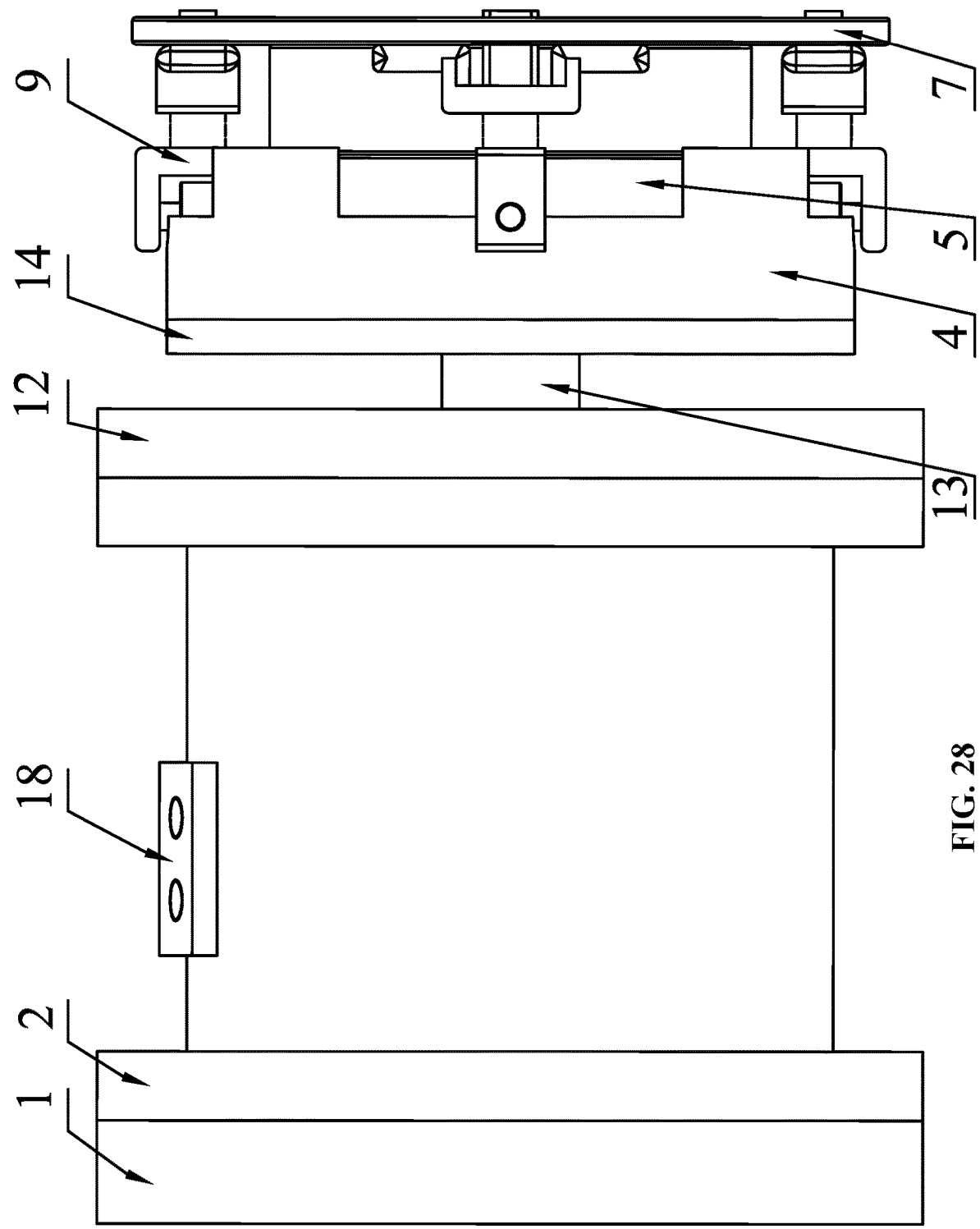
FIG. 28 is a sketch drawing of a passive follow-up hydraulic rotary joint for a robot according to another example of the disclosure.

As shown in FIG. 25 and FIG. 26, the stable supporting wheel mechanism 9 comprises a supporting wheel 60, a supporting plate 61 and a spring 62, the supporting wheel 60 comprises a left sliding wheel, a middle sliding rod and a right convex spigot, the diameter of the left sliding wheel on the supporting wheel 60 is equal to the diameter of the wheel groove on the stabilizing ring 4, the middle sliding rod of the supporting wheel 60 is sleeved with the spring 62, the supporting plate 61 is sleeved on the middle sliding rod of the supporting wheel 60 by means of a hole opened in the middle of the supporting plate 61; bolt holes are symmetrically opened on both ends of the supporting plate 61, the convex spigot on the right end of the supporting wheel 60 has the same size as the concave spigot on the torque transfer disk 7, the spigots are in clearance fitting with each other, and the bolt holes on the supporting plate 61 is matched with bolt holes on both sides of a corresponding concave spigot on the torque transfer disk 7.

With the adoption of the foregoing technical solutions, when a force transferred from an end of the torque transfer disk 7 onto a joint is beyond a safety index, the stable supporting wheel mechanism 9 connected to the valve core 16 is separated from the stabilizing ring 4 on the tray mechanism connected to the output shaft at the right end of the valve body 13, and the torque transfer disk 7 drives the valve core 16 to rotate. Due to the principle of self-servo, a driving force of the valve core 16 is transferred to the valve body 13 to cause an output shaft of the valve body 13 to follow up movement passively so that the mechanism moves in a direction of reducing an impact force.

The main high-pressure oil inlet P of the device communicates with the third oil passage of the cylinder body through the high-pressure oil passage 24 of the left end cover and then with the annular high-pressure oil groove 36 of the valve body and then with the folding-line-shaped oil passage 20 of the valve body and finally with the left P port 43 and right P port 44 of the valve sleeve.

When the valve core 16 rotates anticlockwise relative to the valve sleeve 3, high-pressure oil enters the rectangular groove on the second annular boss 49 of the valve core 16 through the left P port 43 of the valve sleeve, then enters the right A port 42 of the valve sleeve, and finally enters the first working chamber 54 through the first rectangular valve port 38 of the valve body 13 to push the blade 22 to rotate anticlockwise so that the valve body 13 moves along with the valve core 16. The low-pressure oil of the second working chamber 55 enters the right B port 46 of the valve sleeve through the second rectangular valve port 39 of the valve body 13, then enters the rectangular groove on the fourth annular boss 51 of the valve core 16, and finally enters the right T port 47 of the valve sleeve.

When the valve core 16 rotates clockwise relative to the valve sleeve 3, the high-pressure oil enters the rectangular groove on the third annular boss 50 of the valve core 16 through the right P port 44 of the valve sleeve, then enters the left B port 45 of the valve sleeve, and finally enters the second working chamber 55 through the second rectangular valve port 39 of the valve body 13 to push the blade 22 to rotate clockwise so that the valve body 13 moves along with the valve core 16; and the low-pressure oil of the first working chamber 54 enters the left A port 41 of the valve sleeve through the first rectangular valve port 38 of the valve body 13, then enters the rectangular groove on the first annular boss 48 of the valve core 16, and finally enters the left T port 40 of the valve sleeve.

The low-pressure oil of the left T port 40 of the valve sleeve enters the annular low-pressure oil groove 32 of the cylinder body through the first upper oil passage 17 of the valve body and the first lower low-pressure oil passage 23 of the valve body, then enters the first low-pressure oil passage 26 of the cylinder body, and then enters the low-pressure oil outlet T through the low-pressure oil passage 63 of the left end cover to flow back gradually; and the low-pressure oil of the right T port 47 of the valve sleeve enters the annular low-pressure oil groove 37 of the valve body through the second low-pressure oil passage 19 of the valve body, then enters the low-pressure oil passage 63 of the left end cover through the second low-pressure oil passage 27 of the cylinder body, and finally flows back gradually through the low-pressure oil outlet T.

When the left A port 41 of the valve sleeve communicates with the first working chamber 54, the left B port 45 of the valve sleeve communicates with the second working chamber 55, and the right A port 42 of the valve sleeve and the right B port 46 of the valve sleeve are not in communication with each of the first working chamber 54 and the second working chamber 55; and when the right A port 42 of the valve sleeve communicates with the first working chamber 54, the right B port 46 of the valve sleeve communicates with the second working chamber 55, and the left A port 41 of the valve sleeve and the left B port 45 of the valve sleeve are not in communication with each of the first working chamber 54 and the second working chamber 55. The valve port of the valve sleeve is not in communication with each of the first working chamber 54 and the second working chamber 55 except for the case as above.

The mechanism restores to a stable supporting state again after an impact force disappears.

The invention claimed is:

1. A rotary joint, comprising:
   1) a hydraulic follow-up mechanism, the hydraulic follow-up mechanism comprising a cylinder body, a valve sleeve, a valve core, a valve body, a left end cover, and a right end cover; and
   2) a rotary transmission mechanism, the rotary transmission mechanism comprising a tray, a stabilizing ring, a follow-up disk, a torque transfer disk, and a stable supporting wheel mechanism;
   wherein:

the left end cover and the right end cover are arranged at left and right ends of the cylinder body, respectively;

the valve body is concentrically mounted in a cylindrical hollow chamber of the cylinder body;

an output shaft at a right end of the valve body projects out of the right end cover;

a right end of the valve core is provided with a valve core torque transfer shaft extending rightwards through the right end of the valve body;

the tray and the stabilizing ring constitute a tray mechanism;

the tray mechanism is concentrically mounted on a spigot on an outer side of the output shaft at the right end of the valve body;

the follow-up disk is concentrically mounted on the output shaft at the right end of the valve body;

a thrust ball bearing is concentrically mounted between the follow-up disk and the tray mechanism;

two deep groove ball bearings are concentrically mounted at a right end of the follow-up disk; a fixing nut is mounted at the right end of the valve body; the torque transfer disk is concentrically mounted at the right end of the valve core;

four stable supporting wheel mechanisms are mounted centrally symmetrically on the torque transfer disk; and stabilizing wheels of the four stabile supporting wheel mechanisms are respectively mounted in four stabilizing grooves opened on the stabilizing ring.

2. The joint of claim 1, wherein:

the tray is connected to the stabilizing ring through a screw;

the tray mechanism, the thrust ball bearing, the follow-up disk and the deep groove ball bearing are axially fixed with a shaft shoulder on an output shaft of the valve body and the fixing nut at the right end of the valve body;

the tray mechanism is circumferentially fixed by fitting a convex spigot of the tray with a concave spigot of the valve body on an output shaft of the valve body;

a concave spigot of the torque transfer disk is in transitional fitting with a convex spigot of the valve core; and the stable supporting wheel mechanism is fixed on the torque transfer disk via a bolt.

3. The joint of claim 1, wherein:

the valve body is concentrically mounted in the cylindrical hollow chamber of the cylinder body; two deep groove ball bearings are mounted concentrically at the left and right ends of the valve body; the deep groove ball bearing at the left end is concentrically fixed in a left bearing groove of the cylinder body; and the deep groove ball bearing at the right end is concentrically fixed in a right bearing groove of the cylinder body;

a fixing stopper block in movable fitting with the valve body is arranged exactly at the upper part of an inner wall of the cylinder body; and a blade in movable fitting with the cylinder body is arranged on an outer wall of a cylindrical hollow chamber of the valve body;

the valve sleeve is concentrically mounted in the cylindrical hollow chamber of the valve body; the left end surface of the valve sleeve is fixed with the left end surface of the valve body through a cylindrical pin; the right end of the valve core runs through the valve sleeve and is concentrically mounted in the cylindrical hollow chamber of the valve body; and the left and right ends of the valve core are respectively provided with two thrust ball bearings;

a first oil passage of the left end cover and a second oil passage of the left end cover are correspondingly arranged on the upper and lower parts of the left end cover; two lines formed by connecting the center of circle of the first oil passage of the left end cover and the center of circle of the second oil passage of the left end cover with the center of circle of the left end cover respectively form an angle of 150 degrees;

a first oil passage of the cylinder body is radially arranged on the upper part of the cylinder body; a second oil passage of the cylinder body is also axially arranged on the upper part of the cylinder body; the first oil passage of the cylinder body is in communication with the second oil passage of the cylinder body; the second oil passage of the cylinder body is in communication with the first oil passage of the left end cover; and a third oil passage of the cylinder body in communication with the second oil passage of the left end cover is axially arranged on the lower part of the cylinder body;

an inlet of the first oil passage of the cylinder body is in communication with an annular oil groove of the cylinder body; the annular oil groove of the cylinder body is in communication with a first upper oil passage of the valve body and a first lower oil passage of the valve body; the upper and lower parts of a first radial oil passage are in communication with a left T port of the valve sleeve respectively; the left T port of the valve sleeve is in communication with a rectangular groove on a first annular boss of the valve core; the rectangular groove on the first annular boss of the valve core is in communication with a left A port of the valve sleeve; the left A port of the valve sleeve communicates with a corresponding first working chamber through a first rectangular valve port of the valve body;

an inlet of the second oil passage of the cylinder body is in communication with the first annular oil groove of the valve body; the first annular oil groove of the valve body is in communication with a second annular oil groove of the valve body; the second annular oil groove of the valve body is in communication with a right T port of the valve sleeve; the right T port of the valve sleeve is in communication with a rectangular groove on a fourth annular boss of the valve core; the rectangular groove on the fourth annular boss of the valve core is in communication with a right B port of the valve sleeve; and the right B port of the valve sleeve communicates with a corresponding second working chamber through a second rectangular valve port of the valve body;

an outlet of the third oil passage of the cylinder body is in communication with the annular oil groove of the valve body; the annular oil groove of the valve body is in communication with a folding-line-shaped oil passage of the valve body; the folding-line-shaped oil passage of the valve body is in communication with a left P port of the valve sleeve and a right P port of the valve sleeve respectively; the left P port of the valve sleeve is in communication with a rectangular groove on a second annular boss of the valve core; the rectangular groove on the second annular boss of the valve core is in communication with a right A port of the valve sleeve; and the right A port of the valve sleeve is in communication with a corresponding first working chamber through a first rectangular valve port of the valve body; and the right P port of the valve sleeve is in communication with a rectangular groove on a third annular boss of the valve core; the rectangular groove on the third annular boss of the valve core is in communication with a left B port of the valve sleeve; and the left B port of the valve sleeve is in communication with the corresponding second working chamber through the second rectangular valve port of the valve body.

4. The joint of claim 3, wherein:
the fixing stopper block is divided into an upper arc-shaped stopper sheet and a lower arc frustum stopper block;
an axial length of an upper part of the fixing stopper block is equal to a difference between a length of the cylindrical hollow chamber of the cylinder body and a length of the cylindrical boss of the valve body;
a difference between radians of an upper and lower cambered surfaces of the lower arc frustum of the fixing stopper block is half of a difference between the outer diameter of the cylinder body and outer diameter of the cylinder of the valve body;
a strip-shaped sealing groove is axially arranged in the center of the lower cambered surface of the fixing stopper block;
the strip-shaped sealing groove having the same length as the fixing stopper block is embedded with a stopper block sealing strip;
annular sealing strip grooves are radially symmetrically opened on two sides of a circular hole in the center of the cover body of the right end cover; and
the annular sealing strip groove is embedded with an annular sealing strip.

5. The joint of claim 1, wherein:
the valve body comprises a hollow cylinder, a blade, a cylindrical boss and a valve body output shaft from left to right; an outer diameter of the cylinder is equal to an inner diameter of a circular hole of the cylinder body in nominal size; the cylindrical hollow chamber of the valve body and a bearing groove of the valve body are opened inside the cylinder; an inner diameter of the cylindrical hollow chamber of the valve body is equal to an outer diameter of the valve sleeve in nominal size; two semicircular cylindrical pin holes having the same size are opened on the left end of the cylindrical hollow chamber of the valve body; the two pin holes are distributed to form an angle of 180 degrees; two valve body sealing grooves are opened on a cylindrical surface at the left end of the cylinder; the annular oil groove of the cylinder body is located between two sealing grooves at the left end of the valve body; and the first upper oil passage of the valve body and the first lower oil passage of the valve body are arranged between the sealing grooves;
the blade, a length of which is equal to a difference between a length of the cylindrical hollow chamber of the cylinder body and a length of the cylindrical boss of the valve body, is arranged on a lower part of an outer wall of the cylinder body; the difference between radians of upper and lower cambered surfaces of the blade is half of a difference between an inner diameter of the cylindrical hollow chamber of the cylinder body and an outer diameter of the cylinder of the valve body; a strip-shaped sealing groove is axially arranged in a center of a lower cambered surface of the blade, and the strip-shaped sealing groove having the same length as the blade is embedded with a blade sealing strip;
an outer diameter of the cylindrical boss is equal to the inner diameter of the cylindrical hollow chamber of the cylinder body in nominal size; a cylindrical surface of the cylindrical boss is provided with three valve body sealing grooves; the first annular oil groove of the valve body and the second annular oil groove of the valve body are arranged between the left and middle valve body sealing grooves; and the annular oil groove of the valve body and the folding-line-shaped oil passage of the valve body are arranged between the middle and right valve body sealing grooves;
a second rectangular valve port is arranged on a hollow cylinder close to the cylindrical boss; a first rectangular valve port is arranged on a hollow cylinder close to the left valve body sealing groove; and the first rectangular valve port has the same size as the second rectangular valve port;
a plain line at the opening of the folding-line-shaped oil passage of the valve body is located in exact middle between a plain line of a center of the second rectangular valve port a plain line of the center of the first rectangular valve port; and an angle formed by the plain line of the center of the second rectangular valve port and the plain line of the center of the first rectangular valve port is θ which is calculated according to the following formula:

$$\theta = \frac{b_1 + b_2}{r} \qquad (1)$$

where b1 represents an arc length of the inner wall of the blade, b2 represents an arc length of a rectangular valve port on a hollow cylinder, and r represents an outer diameter of the hollow cylinder; and
a through hole is concentrically arranged inside the valve body; a diameter of the through hole is slightly greater than a diameter of the valve core torque transfer shaft; a left end of the through hole is in communication with the valve body bearing groove; and two concave spigots of the valve body are centrically symmetrically arranged on an outer wall of the right end of the output shaft.

6. The joint of claim 1, wherein
the valve core is provided from left to right with a cylinder, a first annular boss, a second annular boss, a third annular boss, a fourth annular boss, a fifth annular boss and a valve core torque transfer shaft; a right side of each of the first annular boss, the second annular boss, the third annular boss and the fourth annular boss is provided with two rectangular grooves of the same size which are distributed to form an angle of 180 degrees;
each two rectangular grooves are on the same circumferential line; the center line of the two rectangular grooves of the first annular boss and the center line of the two rectangular grooves of the third annular boss are respectively located on two plain lines with two axis centers being symmetrical;
a center line of the two rectangular grooves of the second annular boss and the center line of the two rectangular grooves of the fourth annular boss are respectively located on another two plain lines with two axis centers being symmetrical; and every two adjacent plain lines differ from each other by 90 degrees;
a cylinder is concentrically arranged on the left end of the valve core;

a diameter of the cylinder is equal to an inner diameter of the left thrust ball bearing but slightly smaller than a diameter of a central hole of the left end cover;

the right end of the valve core is provided with the valve core torque transfer shaft; a diameter of the valve core torque transfer shaft is slightly smaller than the diameter of a through hole at the right end of the valve body but equal to the inner diameter of the right thrust ball bearing; and a convex spigot is arranged at a right end of the valve core torque transfer shaft.

7. The joint of claim 1, wherein:

the valve sleeve comprises six annular bosses and five grooves; the annular bosses and the grooves are alternatively arranged; the annular boss at the left end of the valve sleeve is provided with two semicircular cylindrical pin holes arranged to form an angle of 180 degrees; two rectangular openings arranged to form an angle of 180 degrees are arranged on each of a first groove and a fifth groove; the two rectangular openings on the first groove constitute the left T port of the valve sleeve; and the two rectangular openings on the fifth groove constitute the right T port of the valve sleeve; the left and right sides of each of the three grooves in the middle of the valve sleeve are respectively provided with a group of rectangular openings and each group of the rectangular openings comprises two rectangular openings arranged to form an angle of 180 degrees; the rectangular openings on the five grooves have the same size; the center lines of the rectangular openings on each of the five grooves are located on the same respective corresponding plain lines; the rectangular openings on the five grooves have the same size as the rectangular grooves on the four bosses on the valve core; and left side faces of each group of rectangular openings arranged on the left side of each of the three middle grooves of the valve sleeve are on the same plane as the right side face of an adjacent annular boss; right side faces of each group of rectangular openings on the right side of each of the three middle grooves are on the same plane as the left side face of an adjacent annular boss; six groups of rectangular openings in the middle of the valve sleeve are the left A port of the valve sleeve, the right A port of the valve sleeve, the left P port of the valve sleeve, the right P port of the valve sleeve, the left B port of the valve sleeve and the right B port of the valve sleeve in sequence from left to right.

8. The joint of claim 1, wherein:

the tray mechanism is formed by connecting the disk-shaped tray and the stabilizing ring through a bolt;

a through hole is opened in the center of the tray;

two convex spigots of the tray are symmetrically arranged on the through hole;

the convex spigot of the tray corresponds in position to the concave spigot on the output shaft of the valve body;

a right end of the stabilizing ring is provided with four wheel grooves symmetrically arranged at a same spacing in a circumferential direction and four stopper blocks symmetrically arranged at a same spacing in a circumferential direction; and each of the stopper blocks and an adjacent wheel groove are arranged to form an angle of 45 degrees.

9. The joint of claim 1, wherein:

the follow-up disk is a stepped cylinder;

an inside of the follow-up disk is divided into three cylindrical chambers comprising a left chamber, a middle first cylindrical hollow chamber and a right second cylindrical hollow chamber;

a diameter of the first cylindrical hollow chamber is equal to a circumferential diameter of the outer wall of the deep groove ball bearing;

a length of the first cylindrical hollow chamber is equal to a sum of the lengths of the two deep groove ball bearings;

a diameter of the second cylindrical hollow chamber is greater than the diameter of the first cylindrical hollow chamber; and a length of the second cylindrical hollow chamber is equal to a distance from the right end of the first cylindrical hollow chamber to the left end of the torque transfer disk.

10. The joint of claim 1, wherein:

the torque transfer disk is in the shape of a disk having a concave spigot in the center of the disk;

four pairs of bolt holes and four concave spigots are centrally symmetrically arranged in a circumferential direction on the torque transfer disk and each pair of bolt holes are symmetrically distributed on both sides of one concave spigot;

the stable supporting wheel mechanism comprises a supporting wheel, a supporting plate and a spring;

the supporting wheel comprises a left sliding wheel, a middle sliding rod and a right convex spigot;

the diameter of the left sliding wheel on the supporting wheel is equal to the diameter of the wheel groove on the stabilizing ring;

the middle sliding rod of the supporting wheel is sleeved with the spring;

the supporting plate is sleeved on the middle sliding rod of the supporting wheel by means of a hole opened in the middle of the supporting plate;

bolt holes are symmetrically opened on both ends of the supporting plate;

the convex spigot on the right end of the supporting wheel has the same size as the concave spigot on the torque transfer disk; and the spigots are in clearance fitting with each other, and the bolt holes on the supporting plate is matched with bolt holes on both sides of a corresponding concave spigot on the torque transfer disk.

\* \* \* \* \*